FIG. 29

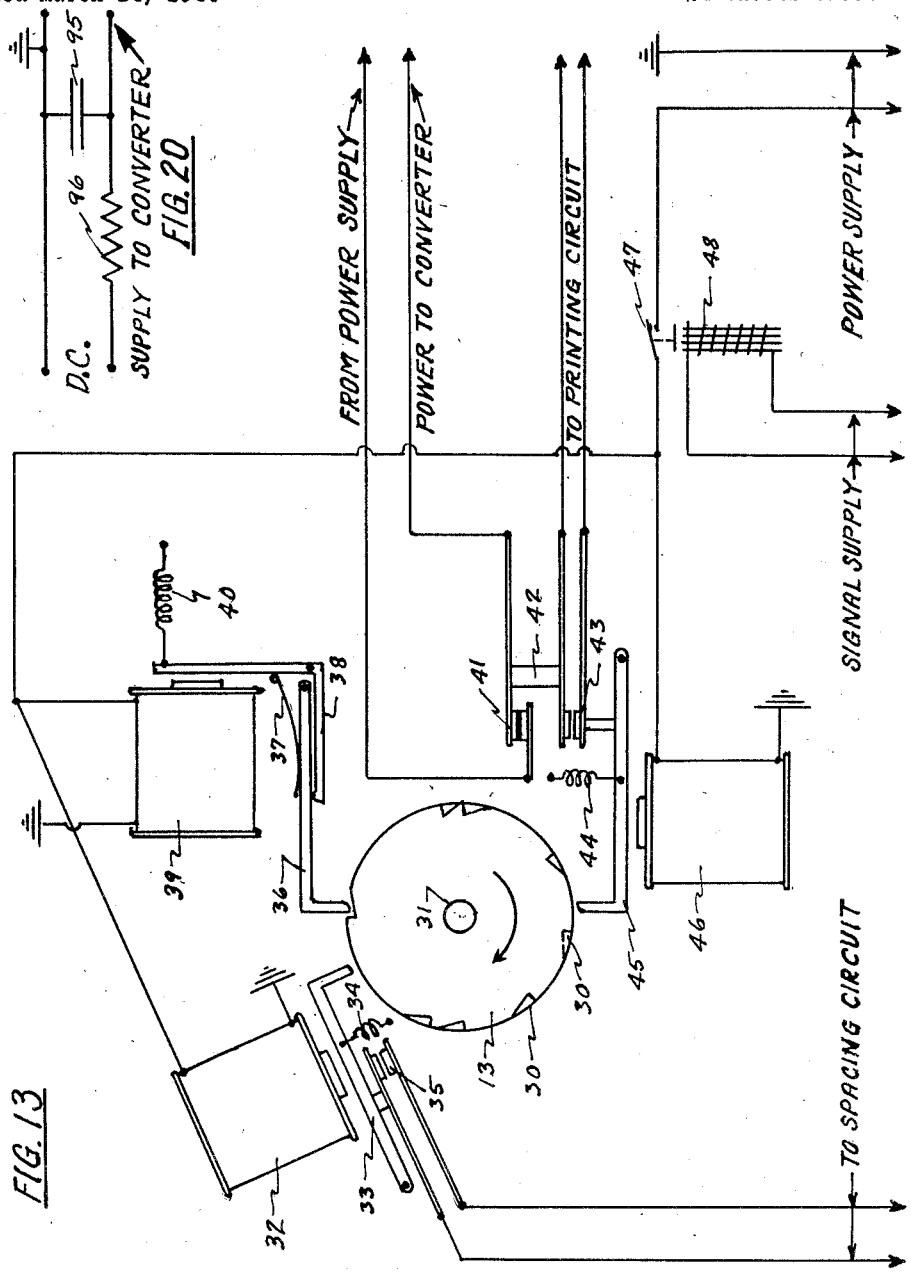

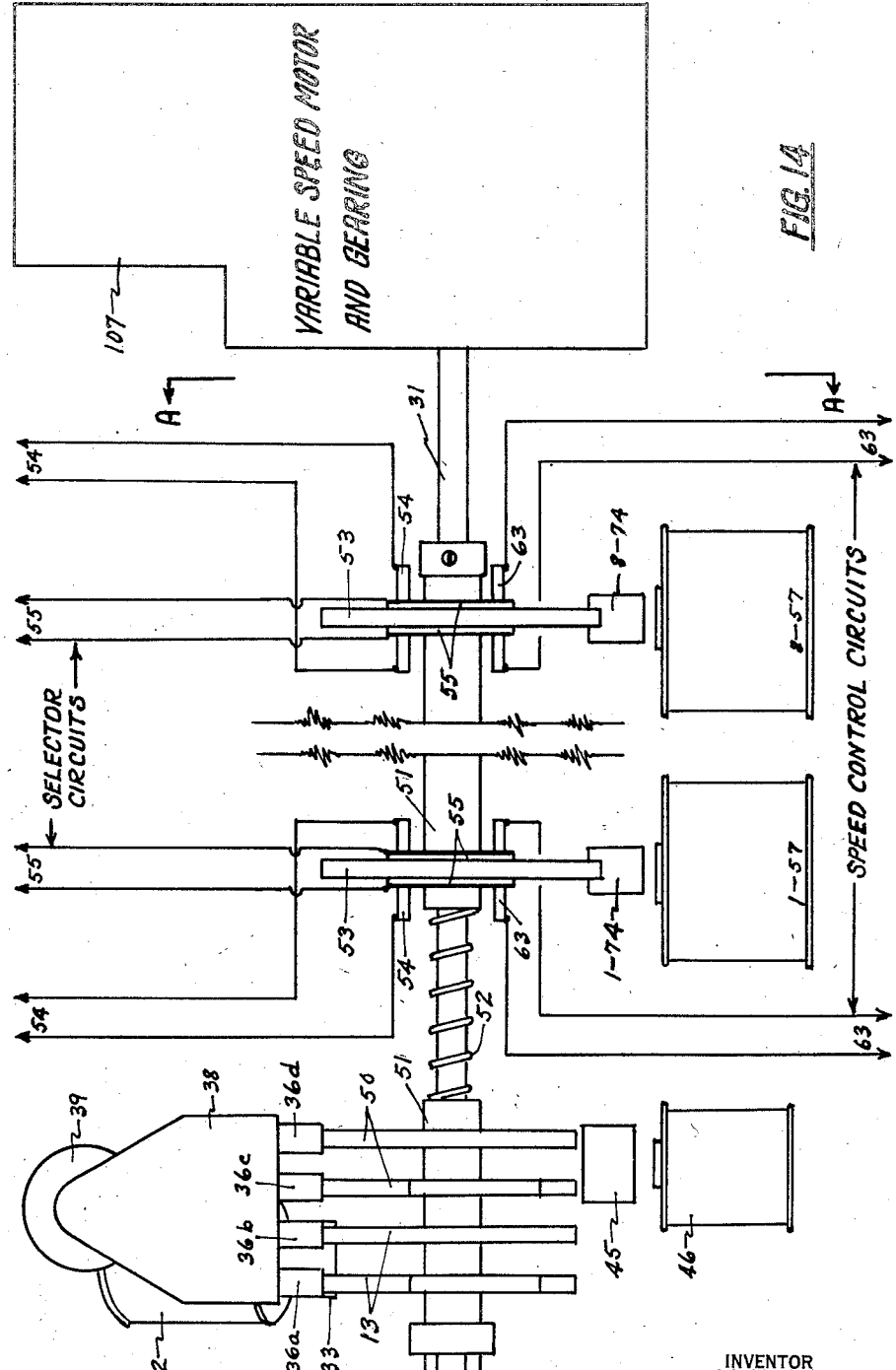

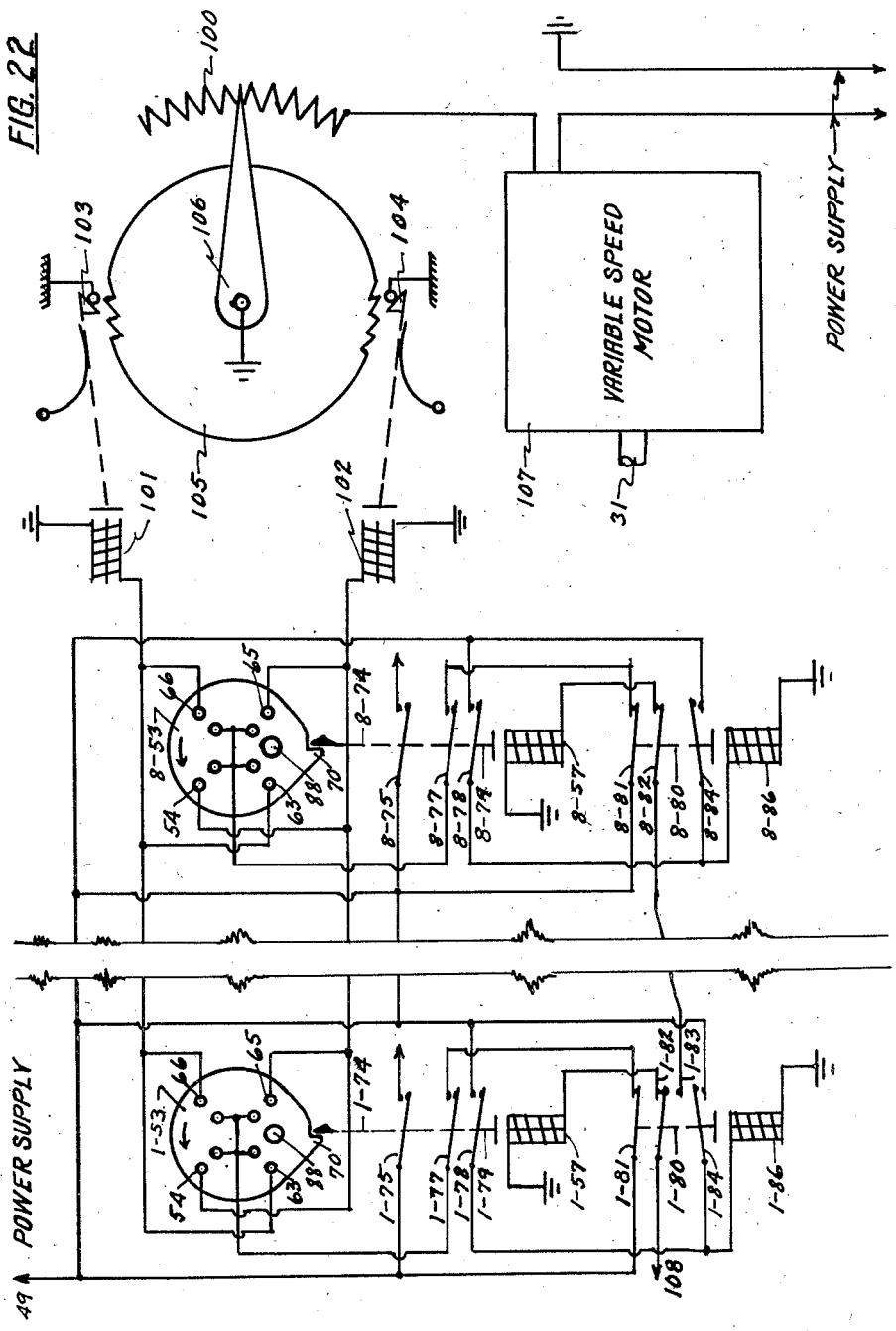

June 2, 1953 — L. M. WEIR ET AL — 2,640,876
TELEGRAPHIC CODE CONVERTER
Filed March 14, 1944 — 24 Sheets-Sheet 16

INVENTOR
L. M. WEIR
C. J. WEIR, JR.
BY
ATTORNEY

June 2, 1953     L. M. WEIR ET AL     2,640,876
TELEGRAPHIC CODE CONVERTER
Filed March 14, 1944     24 Sheets-Sheet 17
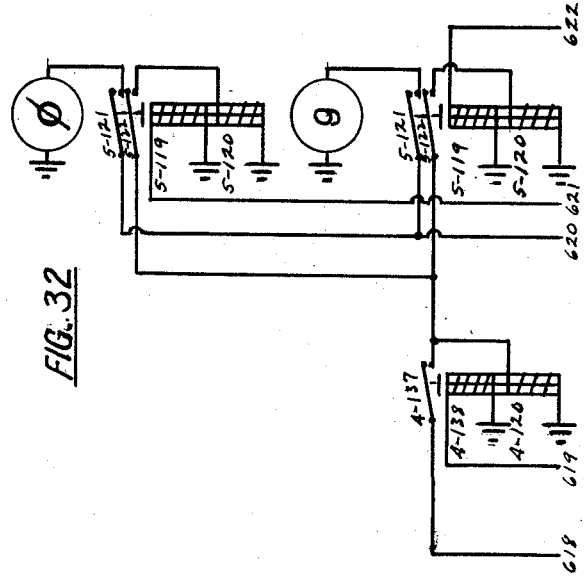
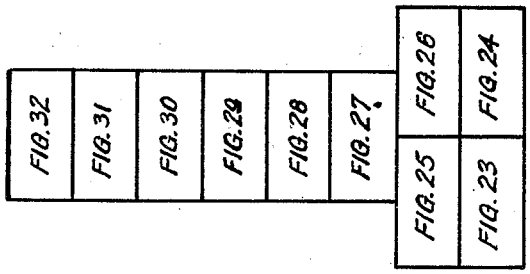
INVENTOR
L. M. WEIR
C. J. WEIR, JR.
BY
ATTORNEY June 2, 1953
L. M. WEIR ET AL
2,640,876
TELEGRAPHIC CODE CONVERTER
Filed March 14, 1944
24 Sheets-Sheet 18
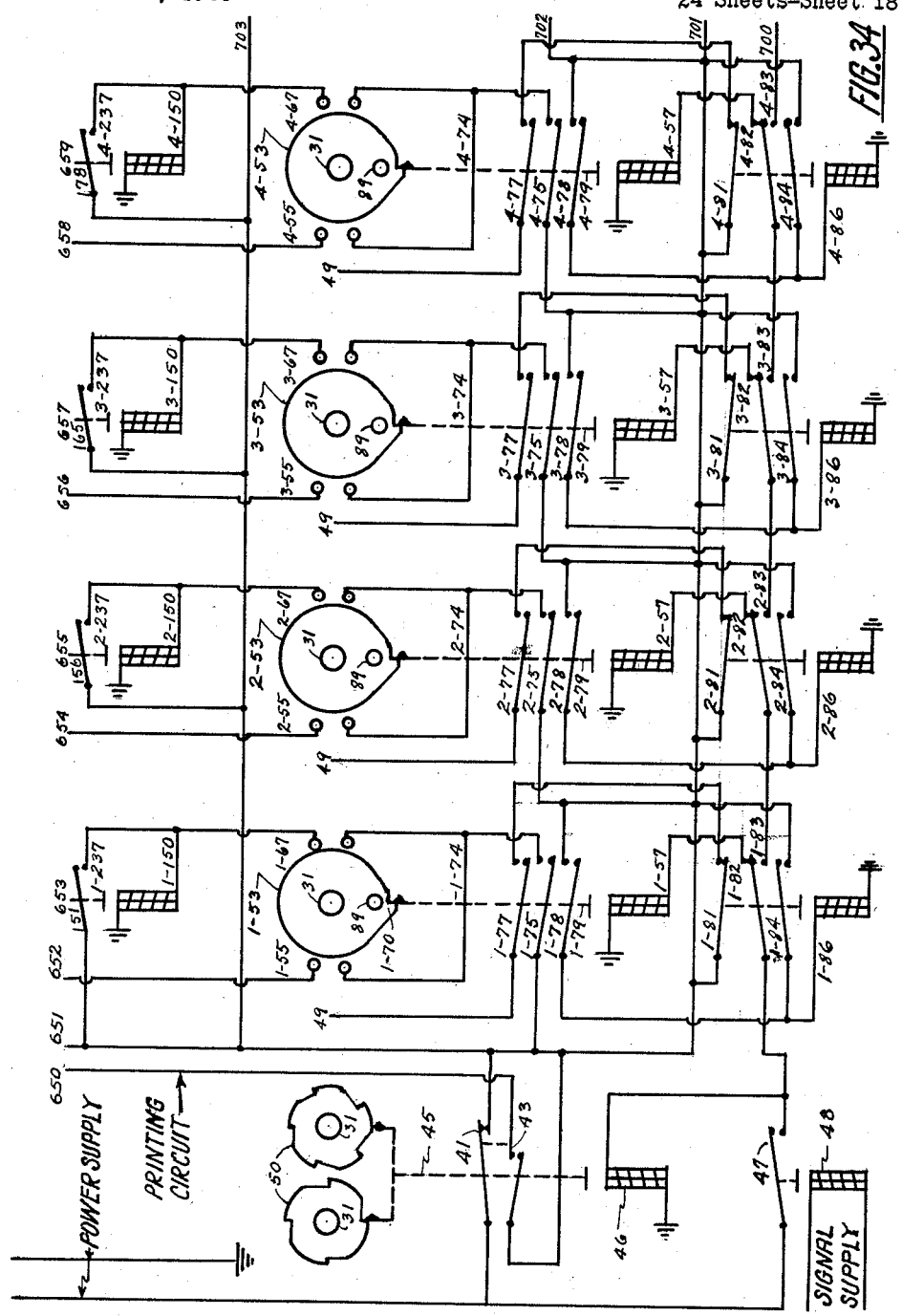
INVENTOR
L. M. WEIR
C. J. WEIR, JR.
BY
ATTORNEY

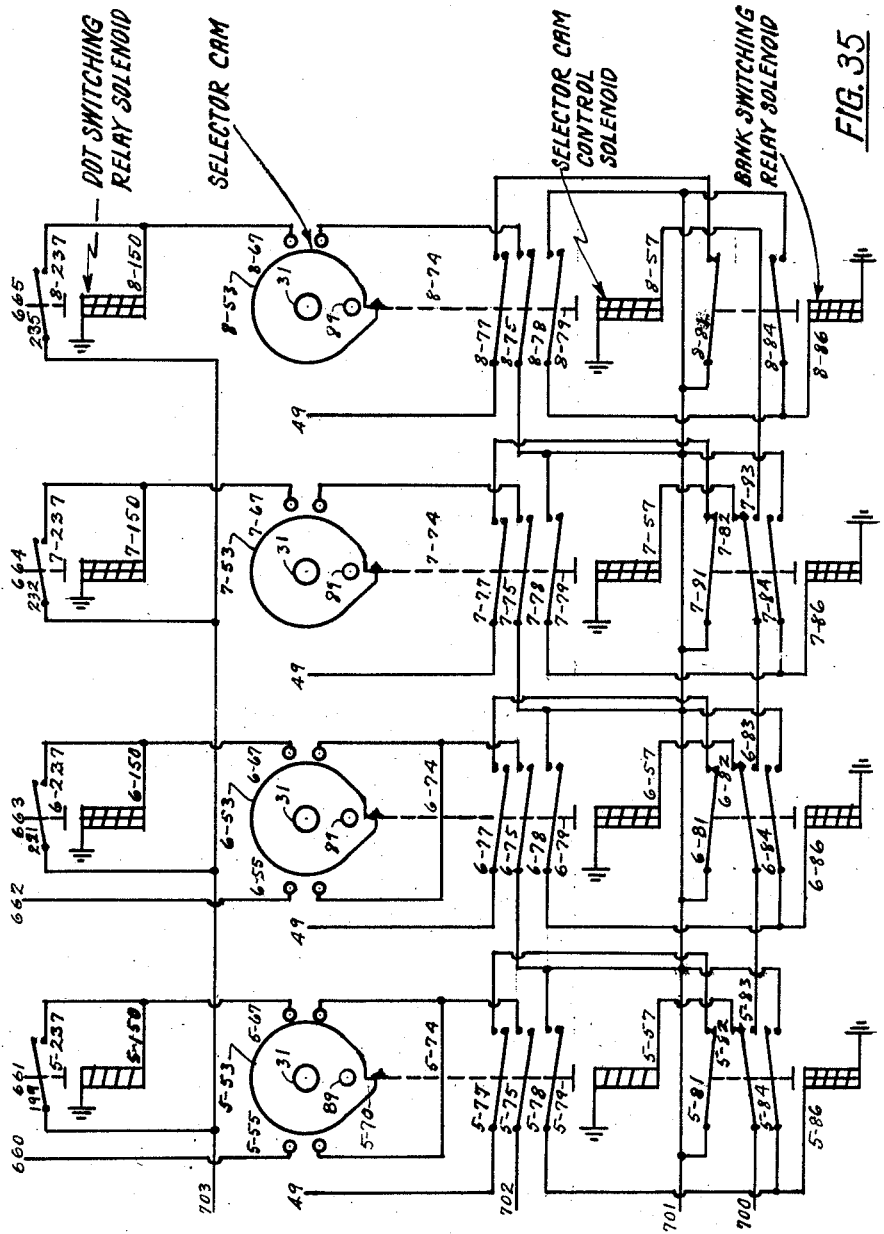

June 2, 1953 L. M. WEIR ET AL 2,640,876
TELEGRAPHIC CODE CONVERTER
Filed March 14, 1944 24 Sheets-Sheet 22

INVENTOR
L. M. WEIR
C. J. WEIR. JR.
BY
ATTORNEY

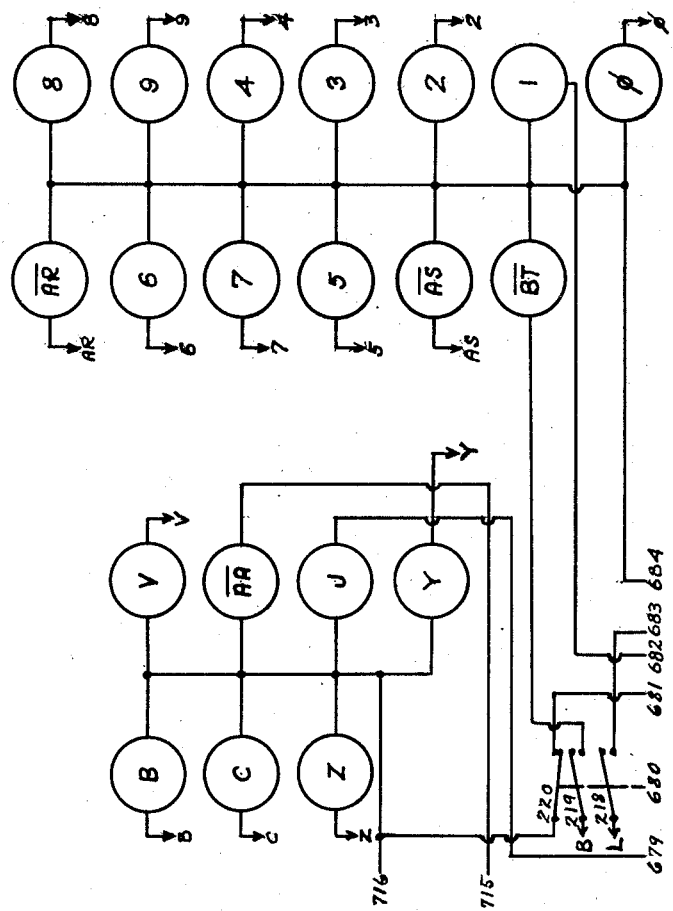

Patented June 2, 1953

2,640,876

UNITED STATES PATENT OFFICE 2,640,876

TELEGRAPHIC CODE CONVERTER

Leander M. Weir, United States Navy, and Casper J. Weir, Jr., San Luis Obispo, Calif.

Application March 14, 1944, Serial No. 526,396

28 Claims. (Cl. 178—22)

This invention relates in general to telegraphic code converters, and in particular to a device that will convert telegraphic code, as received by a radio receiver or over land wires, into its equivalent letters, numerals, characters and spaces, and print them directly onto a tape.

This invention is to be distinguished from the telegraphic code converters of the prior art including those which perforate a tape with code characters and retransmit from the tape into a printing device, and those utilizing special code wheel transmitters for special printing receivers. Each of the devices of the above mentioned prior art requires a separate communication channel for its code, does not print directly from the code as received by radio or land wires, and does not automatically regulate its speed to follow changes in the speed of transmission.

In our converter, circuit-controlling members for transmitting to a selection maze, impulses representative of dots, dashes and spacings, are rotated always in one direction to avoid impression upon the maze of false impulses; moreover, the lengths of the successive dots, dashes and spaces comprising each code character are individually measured by different units of the circuit-controlling members to ensure proper identification of the code character notwithstanding substantial departure from normal of the lengths of its signal and space components.

Our converter may be utilized at shore stations, aboard ships, and at any other location where communication circuit receiving watches are maintained. One of its advantages is the reduction in required number of experienced operators because the converter automatically and properly records the messages conveyed by any signal capable of interpretation by an operator. Use of our converters is particularly advantageous when a number of communication channels must be continuously guarded or monitored.

A feature of the converter is that if a succession of signals does not correspond to a character of the code, the system does not become blocked or inoperative. Furthermore, our converter automatically accommodates itself to changes in speed of transmission without the loss of characters, provided the rate of change of speed is not too great; the converter automatically regulates its own speed of operation to follow the speed of transmission without need of synchronizing impulses and regardless of whether the transmitter is operated by a tape, or by a manually operated transmitting key inherently subject to the varying speed and inaccurate keying of a manual operator.

Despite irregularities in their durations, the device distinguishes dots from dases and inter-character from intra-character spacings up to the point that (a) the dot is lengthened to the point where it becomes a dash, (b) the dash is shortened to the point where it becomes a dot, and (c) the intra-character interval is lengthened to the point where it becomes an inter-character space. For example, the letter R (International Morse code) is interpreted as an O if the dots are too long, as an S if the dash is too short, and as ETE, AE or EN if the spacing between the respective dots and dashes is improper: an experienced human operator would similarly interpret the misformed letter R The selector system of the converter may be constructed to operate on any predetermined code whose characters comprise various combinations of dots, dashes and spaces, individually representative of a printed letter, numeral or character. The principles upon which operativeness of the selector are based are not peculiar to any particular language; in fact, they are to be followed in construction of our selector for any system of conveying intelligence by means of code characters.

Our converter is for use in conjunction with radio receivers, land wire telegraph systems and electrically operated tape printers as are in common use; no alterations to the receiving equipment, codes or printers are required.

In brief summary, the objects of our invention are:

(a) To provide a device that records directly in language the coded intelligence of a communication circuit.

(b) To provide a device that records, directly in language, the received coded intelligence without need of the intermediate step of perforating a preprinter tape.

(c) To provide a recording device operable from either a radio or land wire telegraphic code circuit that normally requires the prolonged attention of an experienced operator.

(d) To provide a device that will operate upon the receipt of any signal that is understandable to an experienced operator.

(e) To provide an automatic system that will not become blocked, inoperative or print a misleading character if a succession of received signals does not correspond to a character of the code.

(f) To provide a device that automatically regulates the speed of reception, without the loss of characters, to accommodate itself to changes in the speed of transmission.

(g) To provide a device that will discriminate between signals of varying length at varying speeds of code transmissions.

(h) To provide a device that selects the printed characters corresponding with different sequences of received signals.

(i) To provide a device that is adaptable to any telegraphic code.

(j) To provide a code converter that is adjustable to conform to the desired ratios between the lengths of dots, and dashes and between the lengths of inter-character and intra-character spacings.

(k) To provide a code converter the sensitivity of whose speed control in response to changes in speed of code transmission is adjustable.

(l) To provide a code converter whose rate of change of speed per cycle of the converter is adjustable.

(m) To provide a device that prints directly from received code without need for synchronizing impulses.

(n) To provide a converter that successively selects the signals as they are received, as distinguished from accumulation of signals in advance of their identification as dots and dashes.

(o) To provide a converter that prints the proper characters not withstanding inaccurate keying of the signals provided the signals are understandable to an experienced operator.

(p) To provide a device that distinguishes between signals of unequal lengths without need to maintain exact ratios of signal lengths.

(q) To provide a converter that utilizes spaces in the telegraphic code to actuate the space-bar of the printer.

(r) To provide a converter that allows feed of recording tape to an associated printer only when a character is being printed or a space is intended.

(s) To provide a converter that may be used on either a single or multiple channel, polarized or non-polarized.

Other objects and features will become apparent upon consideration of the following detailed description and accompanying drawings which are illustrative of, but do not limit the scope of, our invention.

In the drawings:

Figures 13 to 19 and 21 illustrate the cam mechanism.

Figure 20 is a diagram of the power supply circuit.

Figure 22 represents the apparatus for controlling the speed.

Figure 29:
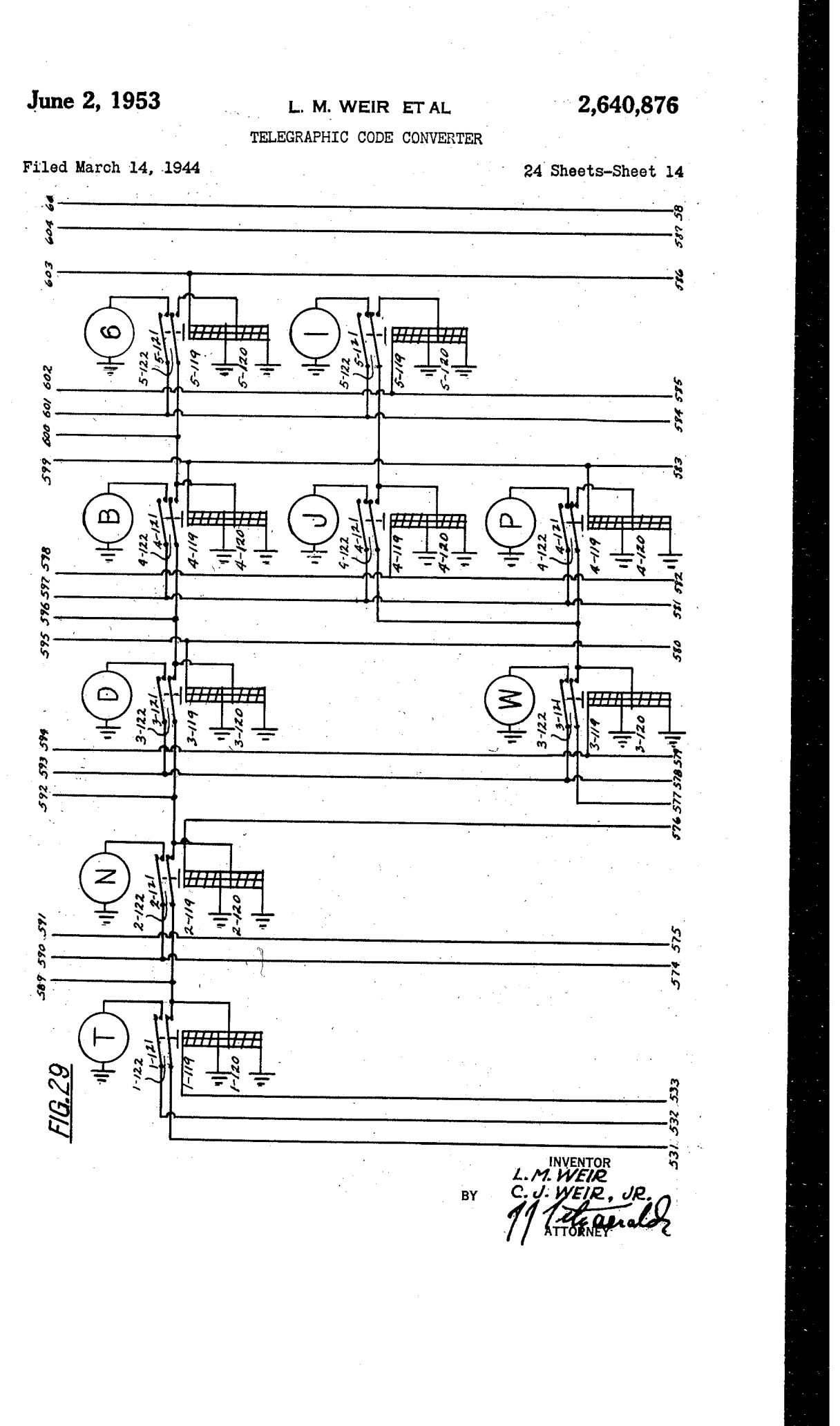

Figures 23 to 32 is a circuit diagram of the selector system.

Figure 33 is a key diagram for the arrangement of Figures 23 to 32.

Figures 34 to 39 is a modified circuit diagram of the selector system.

Figure 40 is a key diagram for the arrangement of Figures 34 to 39.

Figure 41 illustrates the cam cycle for another type of code.

Before proceeding with a detailed description of the various embodiments of the invention, certain general remarks will be made to avoid needless repetition in subsequent parts of the specification and to ensure clarity of exposition.

*General description*

Figure 1:
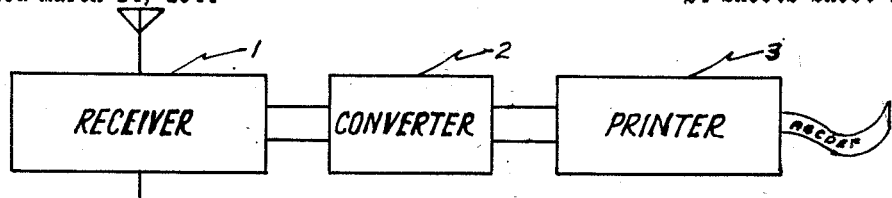
Figure 1 is a schematic diagram of the apparatus of this invention.

Figure 1 is a schematic diagram of a printing telegraphic circuit, in which box 1 represents a conventional radio or land wire receiver, box 3 represents a conventional tape or page printer, and box 2 represents applicants' converter.

Figure 2:
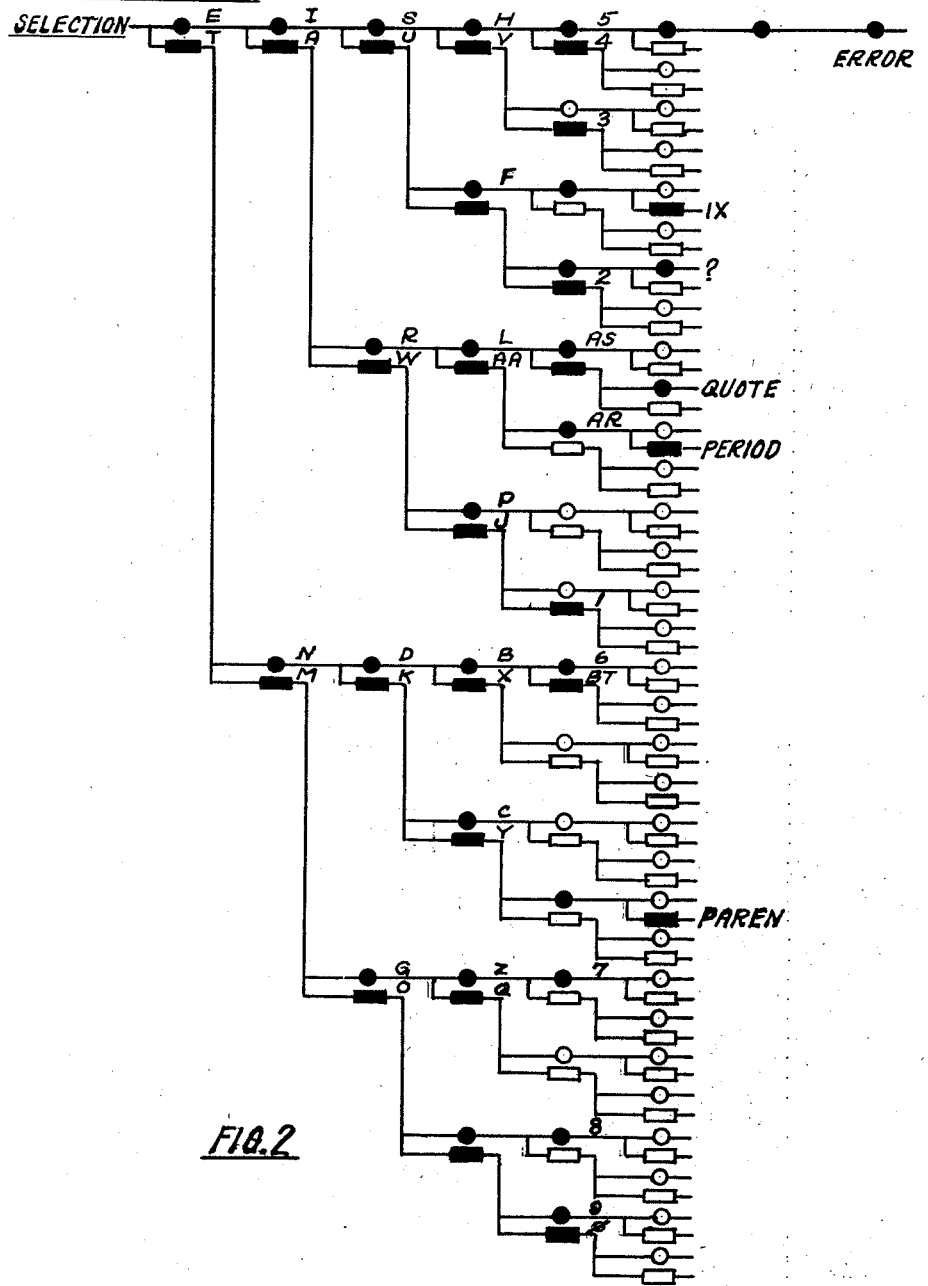
Figure 2 is a diagram of the code character selection.

Figure 2 is a diagram illustrative of the progressive selection of a particular code. (International Morse). For example, assuming the signals start with one dash, and an inter-character follows the dash space, the letter T is selected.

If a dot immediately follows T=(—) and an inter-character space follows the dot, the letter N is selected.

If, however, a dash immediately follows T=(—) and an inter-character space follows the dash, the letter M is selected.

If a dot immediately follows N=(—.) and an inter-character space follows the dot, the letter D is selected.

If, however, a dash immediately follows N=(—.) and an inter-character space follows the dash, the letter K is selected.

If a dot immediately follows D=(—. .) and an inter-character space follows the dot, the letter B is selected.

If, however, a dash immediately follows D=(—. .) and an inter-character space follows the dash, the letter X is selected.

If a dot immediately follows B=(—. . .) and an inter-character space follows the dot, the numeral 6 is selected.

If, however, a dash immediately follows B=(—. . .) and an inter-character space follows the dash, the character $\overline{BT}$ is selected.

It is obvious that the remainder of the progressive selection may be traced out in the diagram in a manner similar to that illustrated above for the characters T, N, M, D, K, B, X, 6, $\overline{BT}$.

Our selector, constructed to effect the selection exemplified by Figure 2, successively identifies the signals without need for any storage of them. In its cycle of operation it differentiates between the signals and between related events.

Since, in properly formed characters of International Morse Code, the spacings between the dots and dashes of a character are equal to that of one dot, the duration of one cycle is chosen as approximately four times that of one dot, the reason for which will be apparent later. It is understood that in speaking of the sequence of dots, dashes and spaces a time relation is set forth, which when translated into motion of cam structure included in our converter corresponds with spacings on, or angular positions of, the cam. The maximum time of the cycle before reset or repetition is one dash plus one intra-character space. This cycle preferably corresponds with one complete rotation of the cam. In addition to a selector cam which distinguishes between dots and dashes, it is desirable to have a cam for recognition of the speed of the dots and dashes as compared to normal or previous speed in order that the apparatus may, by adjustment of the duration of its cycle, accommodate itself to the speed of the incoming signals within variable limits above and below that of a normal dot. A third cam is desirable to insert cycle control in the printing and spacer circuit.

Although the following illustration and description is based on the International Morse Code, the principle of operation is not limited to that code. When a code is used where the ratio of signal lengths differs from 1 to 3, as illustrated in Figure 41, or there are dashes of different lengths, such as in the Continential Morse Code, the cycle is divided accordingly and there are provided additional contacts on, or for operation by, the selector cams.

The selector and speed control cams are or may be integral in the converter, but in Figures 3 to 12 they are separated for clarity of explanation and illustration.

Figure 3:
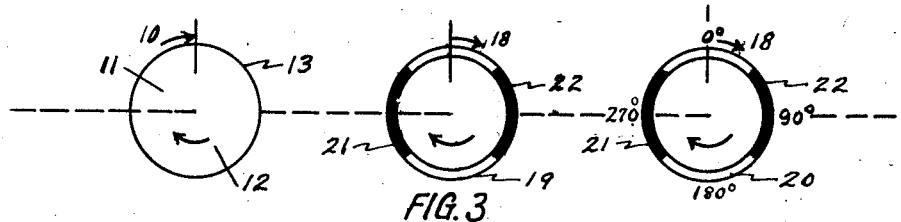
Figures 3 to 12 are schematic diagrams of the actions that may occur during the event of a cycle.

The signal begins with the cam structure at rest on the 0° mark, Figure 3. A normal dot terminates near 90° at or near the center of the dot zone. The length of arc covered by this dot zone determines the latitude to irregularities in the length of dots for any given speed of code transmission (characters per minute) as well as to irregularities in the speed of manually keyed transmissions. This zone enables the dots to be distinguished as such within limits above and below normal speed. It also enables the speed control circuit hereinafter described to increase or decrease the speed of the converter to conform with the speed of the transmission of signals without loss of any printed characters.

A normal dash, being approximately three times the length of a normal dot, covers an arc whose center is at or about the 270° mark. The length of arc covered by this dash zone determines the latitude to irregularities in length of the dashes for any given speed of code transmission as well as to irregularities in manually keyed transmissions. This zone enables the dashes to be distinguished as such within the speed range set forth above.

These dot and dash zones may be varied in position and length to achieve the desired latitude to irregularities in length of the dots and dashes and the desired ratio of optimum lengths of dots and dashes.

The space timer, comprising printing and spacer cams hereinafter described, closes the printer and spacing circuits, as required, within each cycle. The earliest time at which the printing circuit can be closed after the beginning of a signal is just after a space at least the length of a dot (intra-character space) has elapsed; this corresponds with the point or angular position 12. The earliest time at which the spacer circuit can be closed after the beginning of a cycle is just after a space at least the length of a dash (inter-character space) has elapsed; this corresponds with the point or angular position 11.

In considering the various possible combinations of actions that may occur within a cycle, it is again noted that Figure 3 represents the beginning of a cycle initiated by reception of the beginning of a signal at which time the space timer begins to reset toward its 0°. After the termination of each signal, the selector-and-speed cams assume a reset position during the intervening space and prior to the beginning of the next signal; the printing and spacer cams assume a reset position during the time that each signal is being received.

Discrimination between the signals of different lengths and adjustments in speed are determined by the relative amount of the cycle that has been completed at the termination of the signal. The measurement of the length of the spacing within a character, between characters, and between words begins with the termination of each signal. A signal terminating within the zone 22 of a cycle in Figure 3 is selected or recognized as a dot; a signal terminating within the zone 21 is selected or recognized as a dash.

If the signal terminates near the center of the dot or dash zone, no change in speed or angular velocity of the cams is called for; but if the signal terminates in the early part of either of these zones the speed is increased (by means hereinafter described), and if the signal terminates in the later part of either of the zones the speed is decreased.

Figure 4:
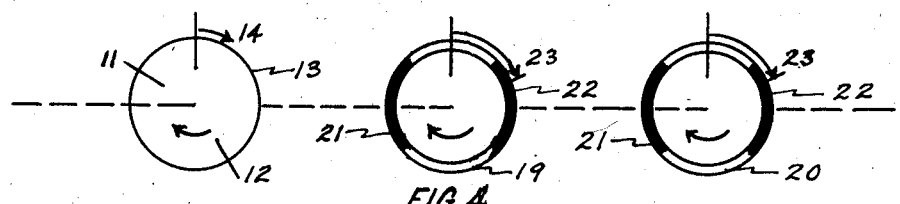

Another action that may occur is shown in Figure 4. If the signal terminates early within the dot zone, such as at 23, it is recognized as a dot, the speed of the device is increased, and the measurement of the length of the following code space or interval begins.

Figure 5:
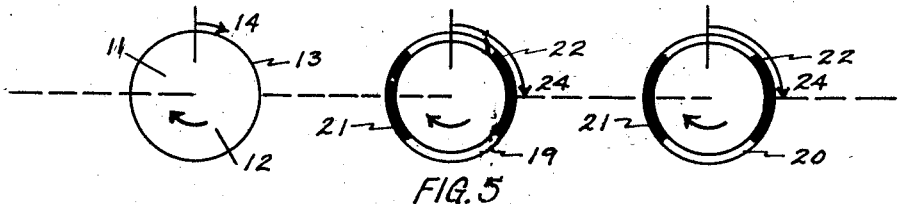

Another action that may occur is shown in Figure 5. If the signal terminates normally within the dot zone, such as at 24, it is recognized as a dot, the speed of the device is held constant, and the measurement of the length of the following code interval begins.

Figure 6:
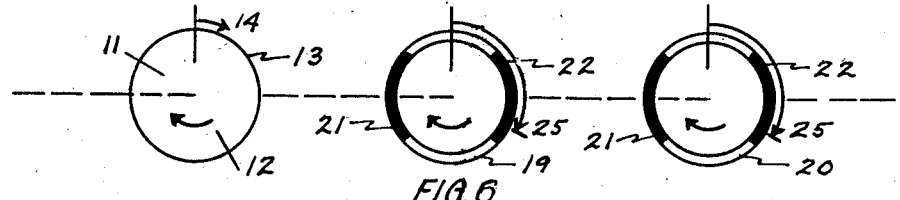

Another action that may occur is shown in Figure 6. If the signal terminates late within the dot zone, such as at 25, it is recognized as a dot, the speed of the device is decreased, and the measurement of the length of the following code interval begins.

Figure 7:
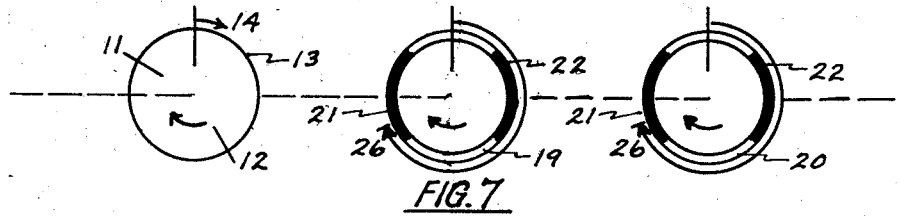

Another action that may occur is shown in Figure 7. If the signal terminates early within the dash zone, such as at 26, it is recognized as a dash, the speed of the device is increased, and the measurement of the length of the following code interval begins.

Figure 8:
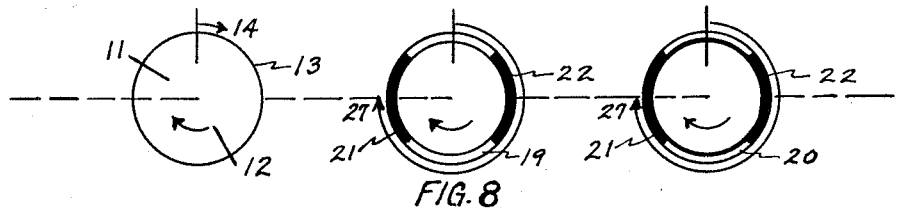

Another action that may occur is shown in Figure 8. If the signal terminates normally within the dash zone, such as at 27, it is recognized as a dash, the speed of the device is held constant, and the measurement of the length of the following code interval begins.

Figure 9:
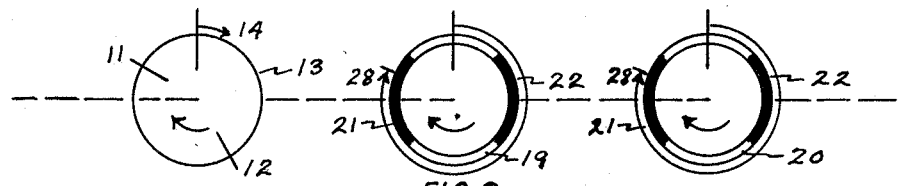

Another action that may occur is shown in Figure 9. If the signal terminates late within the dash zone, such as at 28, it is recognized as a dash, the speed of the device is decreased, and the measurement of the length of the following code interval begins.

Figure 10:
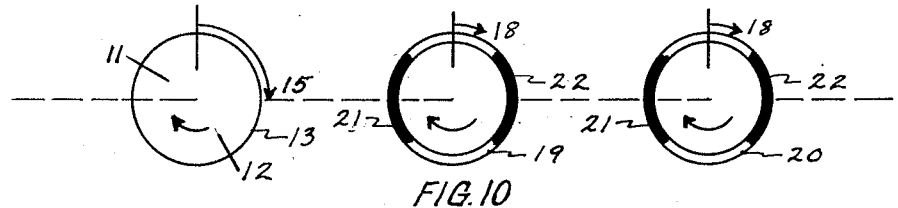

Another action that may occur is shown in Figure 10. At the termination of each signal the measurement of the code space or interval begins. If the length of the arc through which the cam moves before the next signal is received, as at 15, corresponds with that of a space within a code character, the printer neither prints nor spaces, a new cycle begins, and the printing and spacer cams begin their movement to "reset" position.

Figure 11:
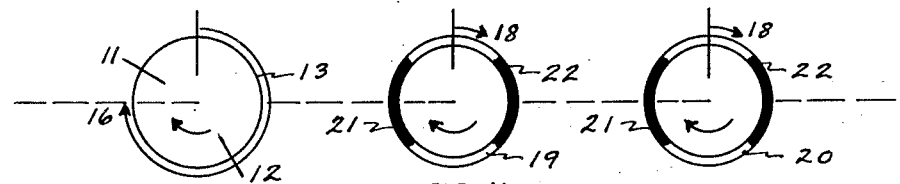

Another action that may occur is shown in Figure 11. If the length of the code space is such that a space between characters is indicated (next signal initiated as at point 16), the printer prints but does not space, a new cycle begins, and the printing and spacer cam begin the process of assuming a reset position.

Figure 12:
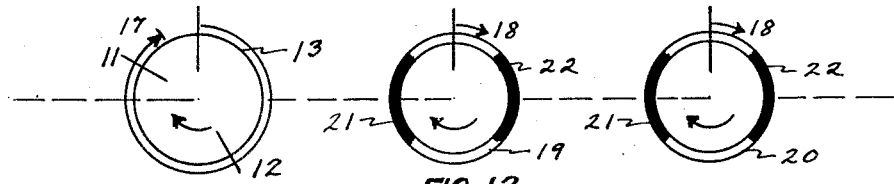
Figure 21:
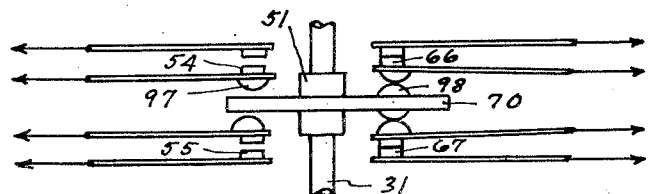

Another action that may occur is shown in Figure 12. If the length of a code spacer is greater than a normal space between characters, (next signal initiated at or after point 17 in the cycle), the printer both prints and spaces to complete a word, for example. The device, including all aforesaid cams remains idle until the beginning of the next following signal, at which time a new cycle begins.

*Structural description*

Figure 42:
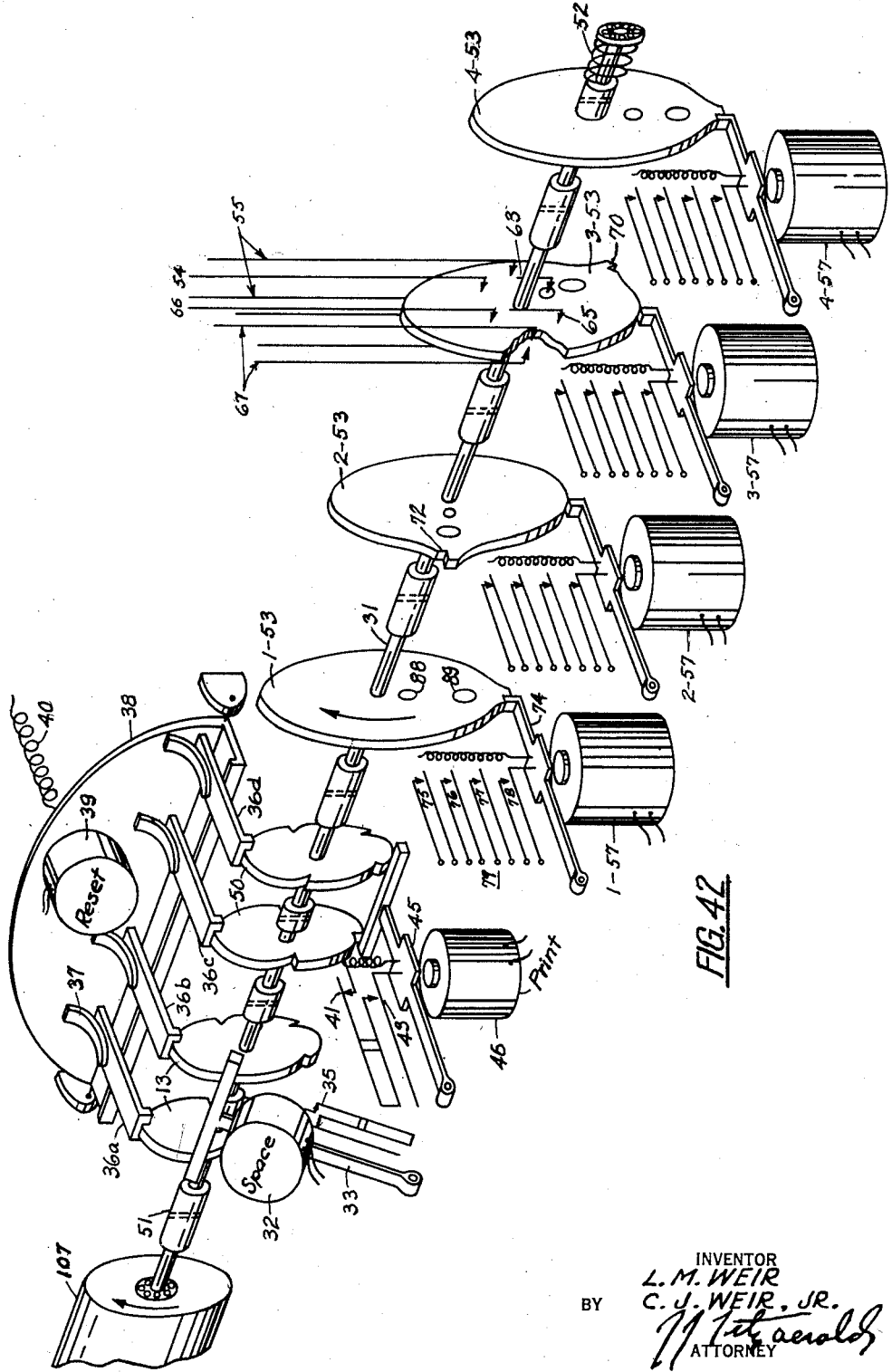
Figure 42 is a perspective view of the cam assembly and associated parts.

The control cams 13 and 50 of Figures 13, 14 and 42 measure the angle of rotation from any given position, in this particular application, from the end of each signal. When a signal is received, "reset" solenoid 39 is energized causing the common actuating bar 38 to release spring biased latches 36a to 36d for engagement with the notches 30 of the respective control cams 13 and 50 independently to arrest their rotation. When the signal ends, the common actuating bar 38 is released by the magnet 39 thus allowing spring 40, through the bar 38, to lift all of the spring biased latches 36a to 36d from engagement with the control cams so to permit them to begin their rotation at the end of each signal.

The notched control cams 13 and 50 are designed to operate in pairs, one cam of each pair having a number of notches 30 around its periphery which is one less than the number of notches 30 in the other cam of the same pair; consequently, when a notch of one cam is aligned or matched with a notch of the other cam of the pair, all the remaining notches of the pair are out of alignment. When matched, the two cams of each pair will rotate independently and at the same speed until the matched notches are engaged by a latch which arrests rotation of both cams. The cams are used in pairs and with the additional notch in one of them in order that the latches (36a to 36d) can reset the cams, after initiation of a signal, in less than the time required for a dot. A quarter cycle is the maximum allowable for resetting of the cams for proper operation of the converter to identify the dot characters (E, S, H, etc.) of the International Morse Code.

When a signal energizes solenoid 32, Figures 13, 14 and 42, the latch 33 is lifted against the bias of spring 34 to release the pair of spacer circuit control cams 13 for rotation, thus permitting them to be reset by latches 36a and 36b, and to break the spacer circuit of the printer through contacts 35.

When the signal energizes solenoid 46, the latch 45 is lifted against the bias of spring 44 to release the pair of printing-circuit control cams 50 for rotation, thus permitting them to be reset by latches 36c and 36d to break the printing circuit of the printer through contacts 43, and to close the power circuit through contacts 41. The switch comprising contacts 43 and switch 41 opens the power supply to the converter after contacts 43 have been closed and closes switch 41 before contacts 43 are opened; this type of switch is called a make-before-break switch.

Considering relays 46, 39 and 32 of Figure 13, upon simultaneous application of a signal to them, relay 39 drops the latches 36a to 36d to stop the rotation of the cams as each reaches the reset position; at the same time latches 45 and 33 of relays 46 and 32 respectively are withdrawn from the pairs of cams to allow them to rotate toward the reset position.

At the end of the signal, relay 39 withdraws latches 36a to 36d from the cams (13, 13; 50, 50) permitting them to begin the measurement of the code space. At the end of the signal, relay 32 deenergizes permitting spring 34 to pull latch 33 against the pair of spacer circuit control cams 13, 13. Since a group of notches, one on each of the cams, is aligned by latch 36, latch 33 is pulled into the two prealigned notches of cams 13, 13 when they arrive adjacent the latch 33. Latch 33 and its mechanism is placed about the periphery of the cams in relation to latches 36a to 36d to determine inter-character spacing; the interval between the end of the signal and the closing of contacts 35 in the spacer circuit of the printer is given the proper timing by so placing latch 33 to determine the printer spacing zone, Figure 12. When latch 33 falls into the aligned notches of the pair of spacer control cams, contacts 35 close thus completing the spacer circuit and cause the printer to space, as between words.

The operation of the mechanism of relay 46 is identical to that of relay 32; the interval between the end of the signal and the closing of contacts 43 in the printing circuit of the printer is given the proper timing by adjusting the position of latch 45 about the periphery of the cams to determine the printing zone, Figure 12. Switch 41 opens the power supply circuit after the printing circuit has been closed thus permitting all of the relays and solenoids in the converter to assume a deenergized or neutral position after a code character has been identified and printed. The interval between the end of the signal and the opening of the power supply circuit is given the proper timing by adjusting the position of latch 45 as pointed out above for the other relays. Once the proper timing of the space and printing circuits is established as required for the desired sensitivity, these circuits must function in the absence of a received signal, because if a signal is received before the completion of the functions, latches 36a to 36d reset the cams, eliminating all functions subsequent to the receipt of the signal but completing all functions prior thereto.

The speed control mechanism is illustrated in Figures 22 and 42. The selector cam and the speed control cam are actually combined into one unit, but for the purposes of this discussion the speed control features only will be considered. Cam 1—53 operates on the same continuously rotating shaft 31 as cams 13 and 50 and functions in a similar manner when latched and unlatched for rotation with shaft 31. The single latch 1—74 is operated by the selector cam control solenoid 1—57; in its normal position latch 1—74 engages lug 70 to hold the cam 1—53 from rotation with shaft 31.

The cam 1—53 has a metallic insert or contact 88 for closing the circuits including the pairs of brushes 54, 63, 65 and 66. The pairs of brushes 54, 63, 65 and 66 are spaced about the cam in the "increase" and "decrease" speed positions referred to in the descriptions of Figures 3 to 12. The adjustment or preselection of the angular positions and/or effective arcuate lengths of the brushes determines the extent of one or more contiguous zones; an "increase" speed zone; "decrease" speed zone and an intervening "No change" speed zone. Completion of the power circuit from brushes 63 or 66 through contact 88 effects energization of the "decrease" speed solenoid 101, Figure 22, which in turn operates spring biased pawl 103 of the motor speed control 100, 106 to decrease the speed of the motor 107 which drives shaft 31. Similarly, contact 88 cooperates with brushes 54 and 65 to energize the "increase" speed solenoid 102 for increasing the motor speed. Contact 1—71 is provided to permit the speed control circuit to close for each selector cam only at the termination of each respective signal.

Each selector bank has a speed control cam 53, similar to 1—53 described above, which furnishes a speed control impulse for each received signal if the speed of the signal has varied from normal. Therefore the speed of the converter automatically accommodates itself to changes in the speed of the incoming signals, and gives the device flexibility for the reception of manually sent code.

The motor 107 is connected to shaft 31 through speed reduction means suitable to provide the desired cam speed of rotation for normal operation. As above described, the control 100, 106 varies the speed of the motor, and thus the angular velocity of the cams to conform to the speed of code reception.

Figure 15:
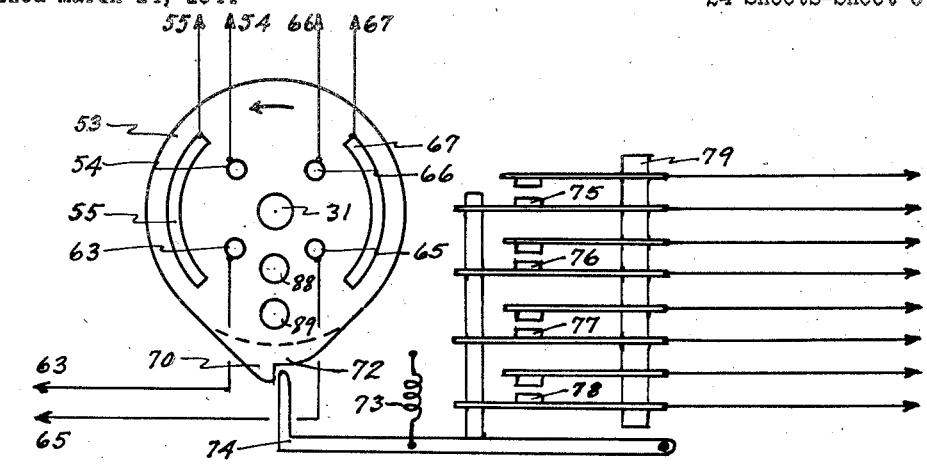
Figure 17:
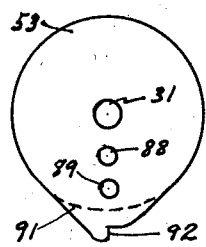
Figure 18:
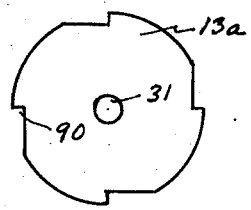
Figure 19:
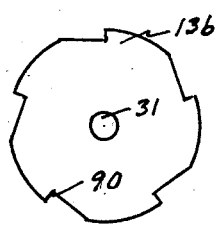
Figure 16:
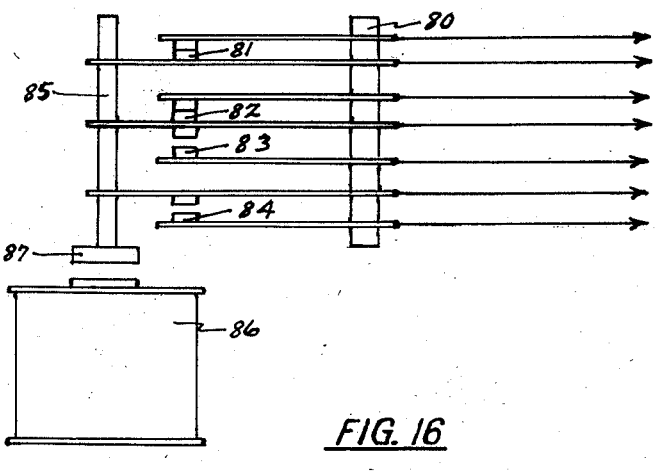

As shown in Figures 14, 15 and 42, in addition to the insert 88, each of cams 53 has a metallic insert 89 for closing a circuit between a pair of arcuate brushes 55 or 67, depending upon the position of the cam when a signal terminates so as to discriminate between a dot and a dash. The angular positions and effective arcuate lengths of these brushes should be adjustable or preselected to afford discrimination between dots and dashes despite wide departure from normal relative lengths.

The cams 53 which loosely fit shaft 31 are spaced along the shaft by collars 51 against which they are pressed by spring 52. The collars 51 are mounted upon the shaft 31 to have slidable movement therewith but are prevented from rotating thereon by suitable means such as key means. The collars press against the loosely fitted cams by reason of the spring 52 to frictionally engage the cams. By mounting the cams in this manner, each rotates freely with the shaft 31 when unlatched but when latched slides between the rotating collars. Each cam has a protruding stop 70 and a raised switch-operating portion 72. The corresponding latch 74 for each cam is spring biased for engagement with the cam and is disengaged therefrom upon energization of the corresponding selector cam control solenoid 57.

As hereinafter appears, the solenoids 57 are energized in sequence, beginning with 1—57, for each code character, the number of solenoids in sequence energized depending upon the number of signals comprising the character.

The latch 74 is mechanically connected to the movable elements of cam-control-contact-pile-up switch 79 whose contacts are held open when the cam is arrested and the spring biased latch 74 is resting on the raised portion of the cam, 72. These contacts are also held open during the reception of a signal. At the termination of the signal, the latch 74 is moved toward the periphery of the cam by the action of the spring 73, closing all of the circuits through contacts 75, 76, 77 and 78.

Included in each bank of the selector is a bank-switching relay 86 which controls the operation of the bank-switching contact assembly 80. The switches are mounted in such a manner that in the absence of a signal in relay 86 the normal position of the contacts are such that two switches 81 and 82 are closed and switches 83 and 84 are open, one each of the open and closed switches having a common movable contact. During the reception of a signal the open switches 83 and 84 are closed and the closed switches are opened through the action of the solenoid armature 85.

The structure of the selector is such that in addition to the above-mentioned apparatus each bank generally contains one printing circuit cutout relay 115, having normally closed contacts in the printing circuit of the preceding bank and an electrical locking coil and contacts. Character selection relays 119 are also included in each bank, having contacts in the printing circuit and an electrical locking coil and contacts.

The number of banks is determined by the number of signals comprised in the longest code character in the telegraphic code used. Certain banks may be somewhat modified for particular purposes, such as by omission of the printing circuit cutout relay in cases where a code character does not terminate in the preceding bank, or by omission of either the dot or dash discriminating brushes in those cases where a dot or dash does not occur in that particular bank.

Figure 23:
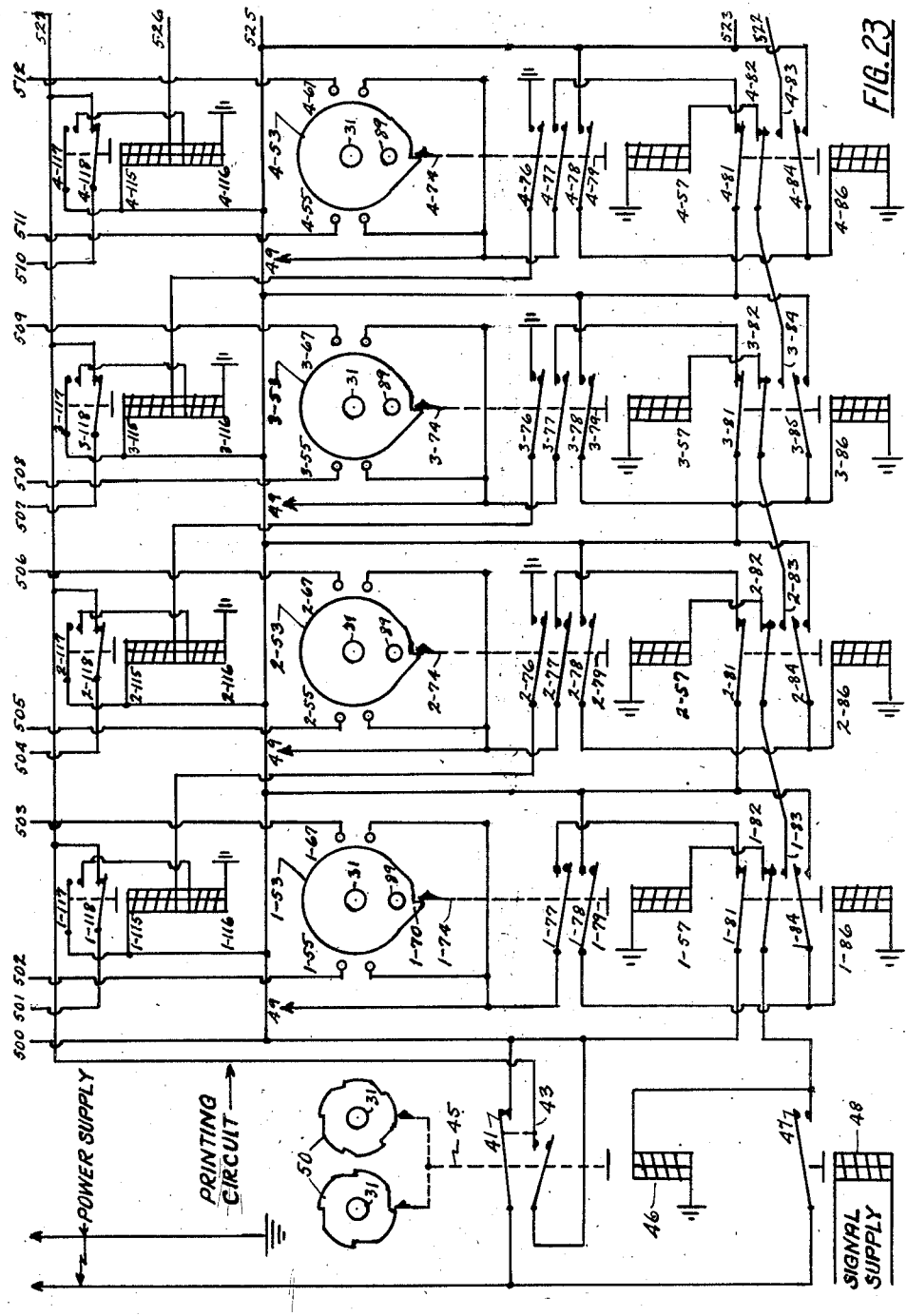
Figure 24:
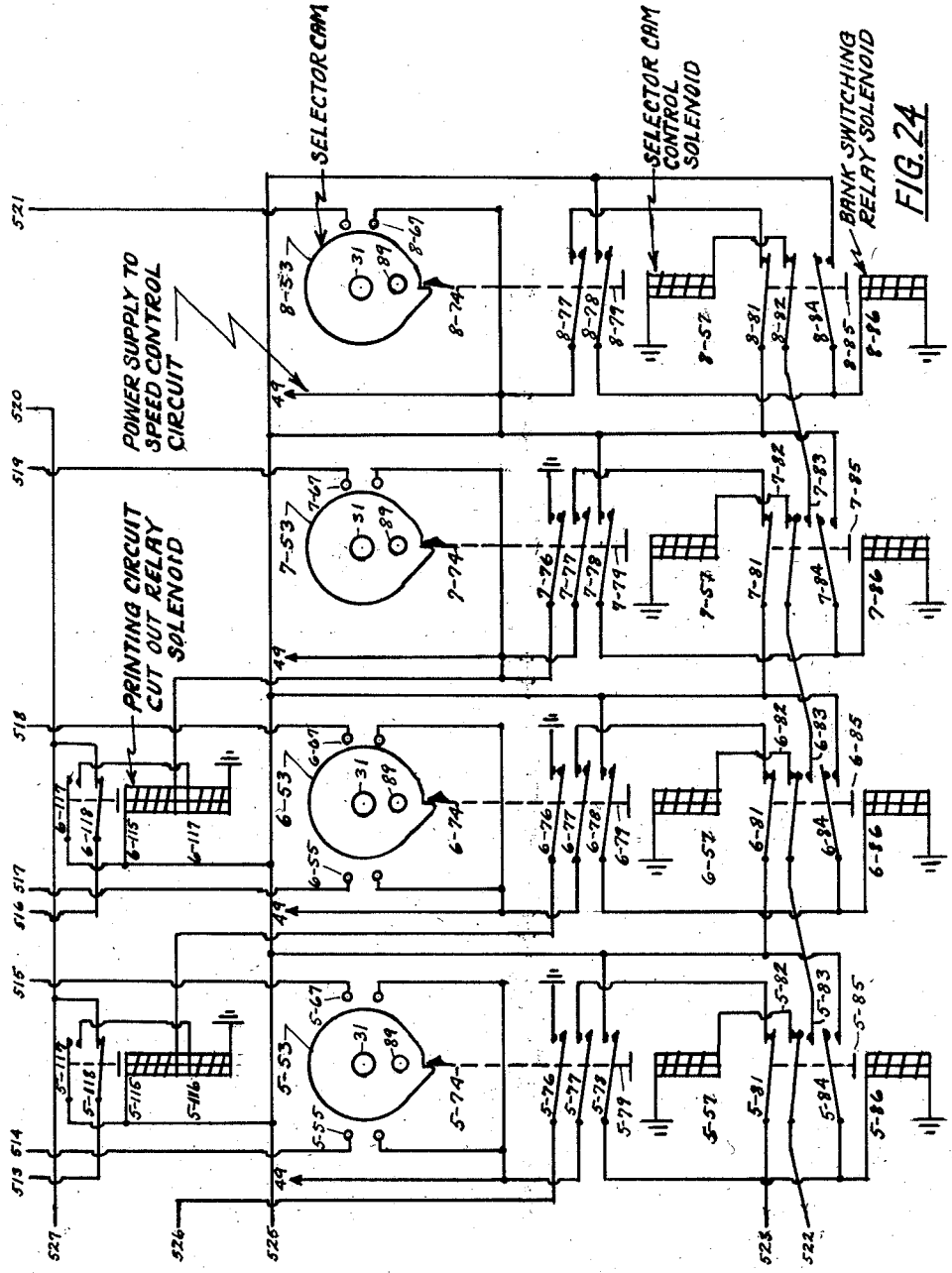
Figure 25:
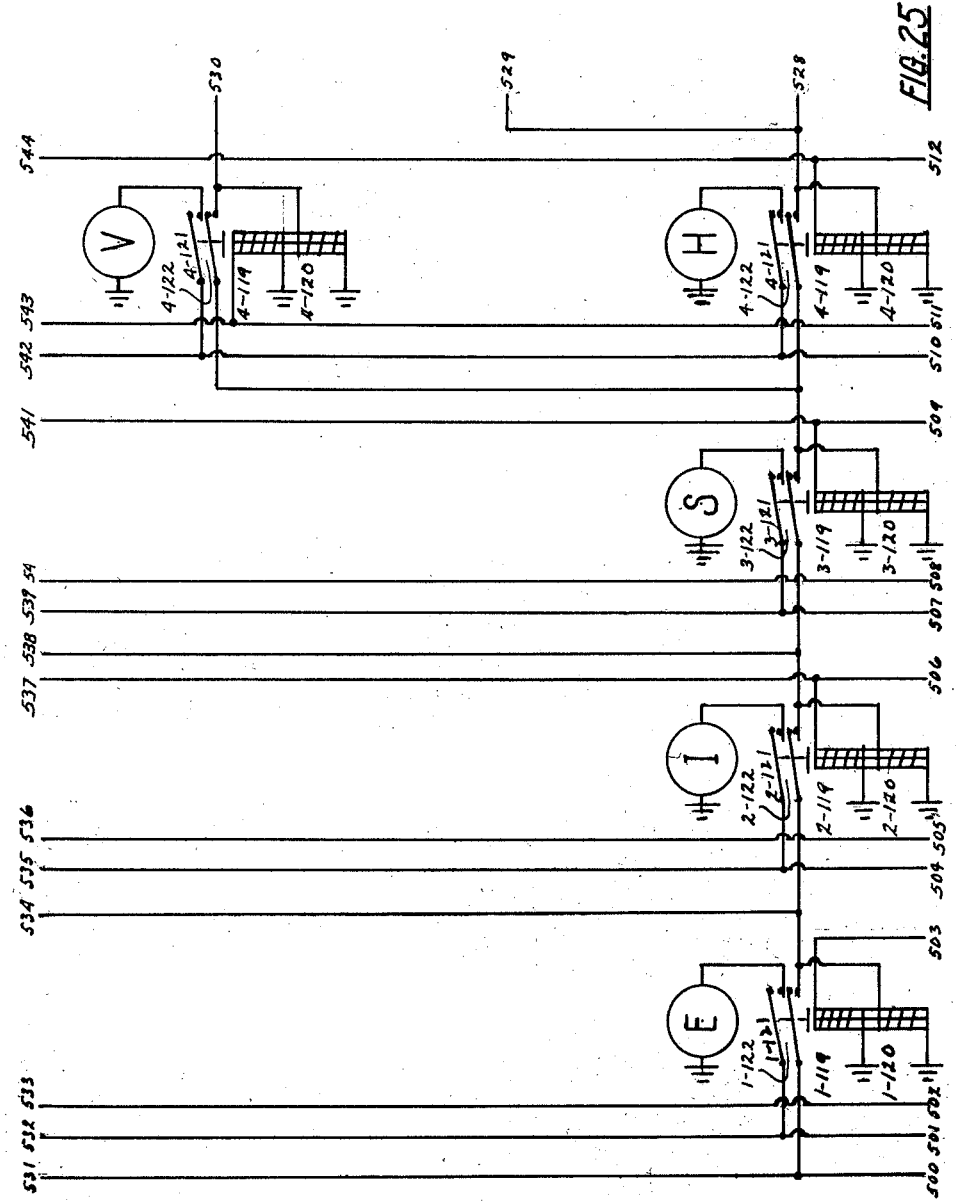
Figure 26:
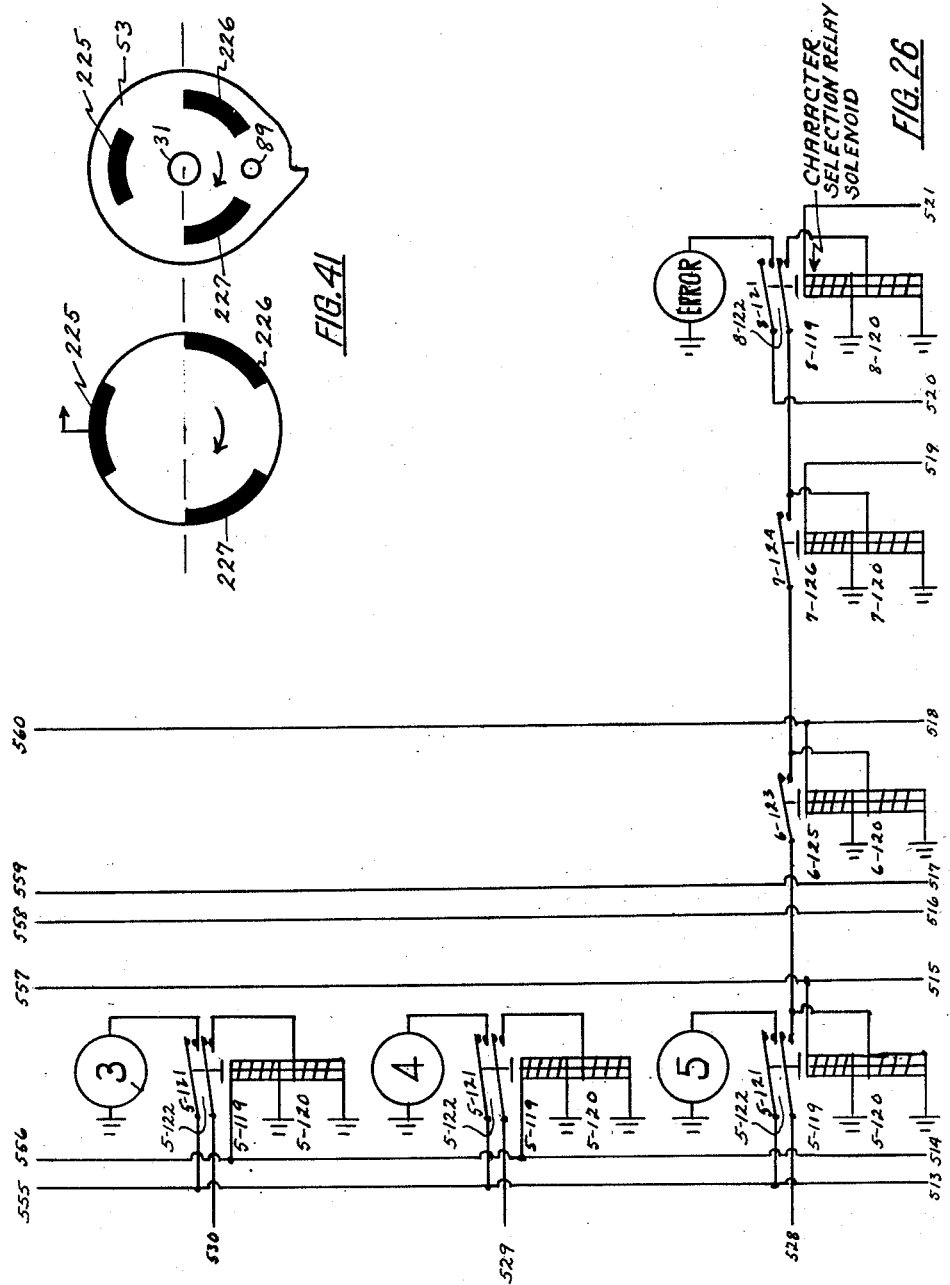
Figure 27:
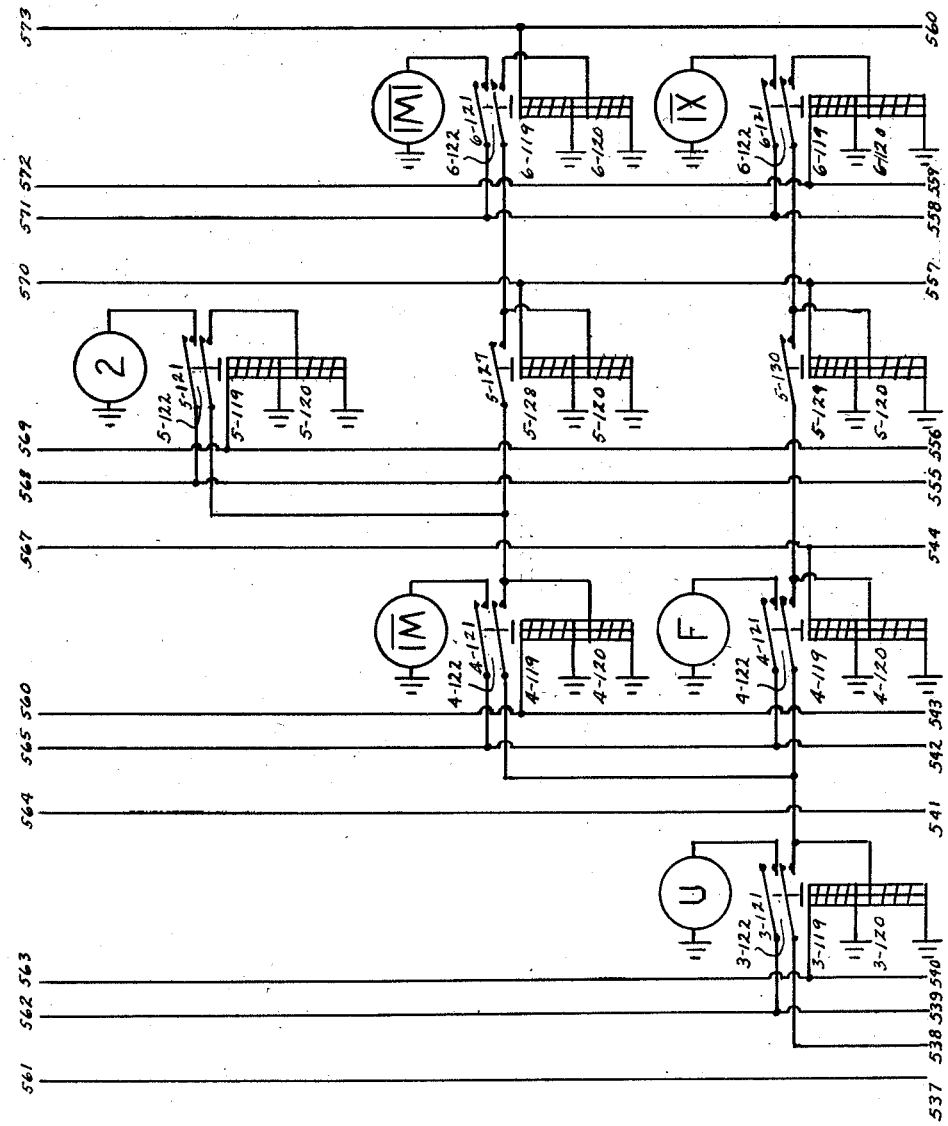
Figure 28:
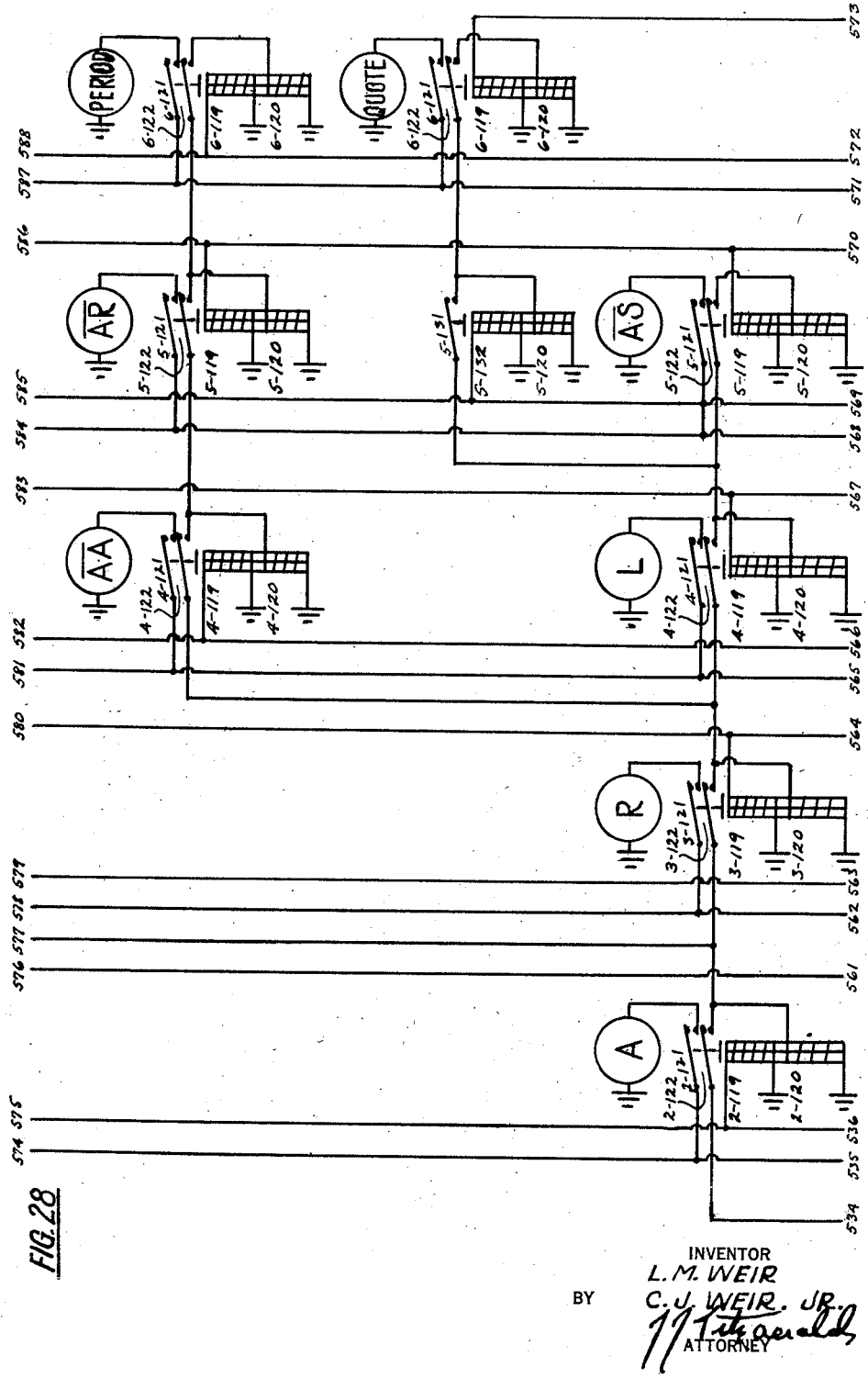
Figure 30:
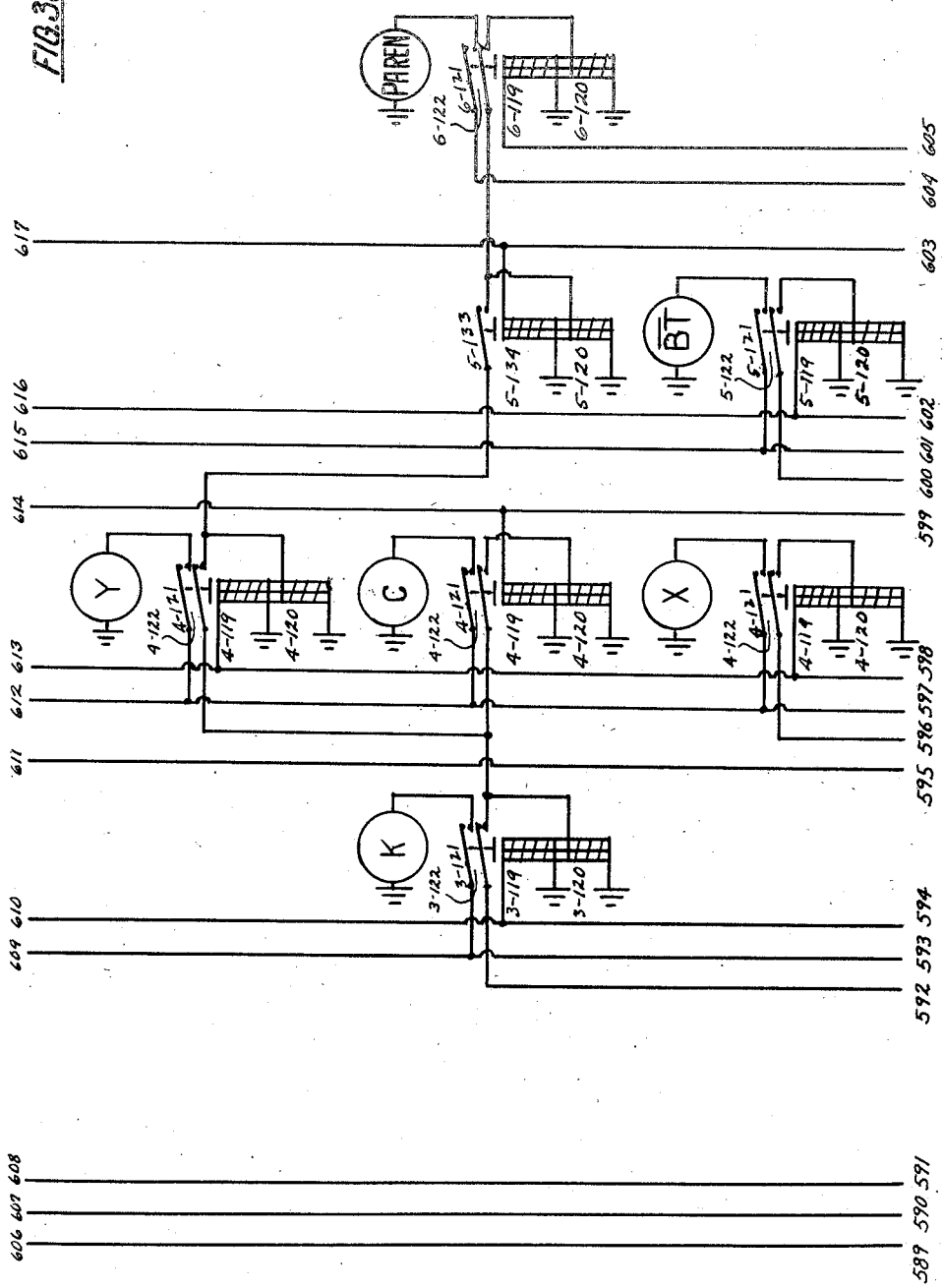
Figure 31:
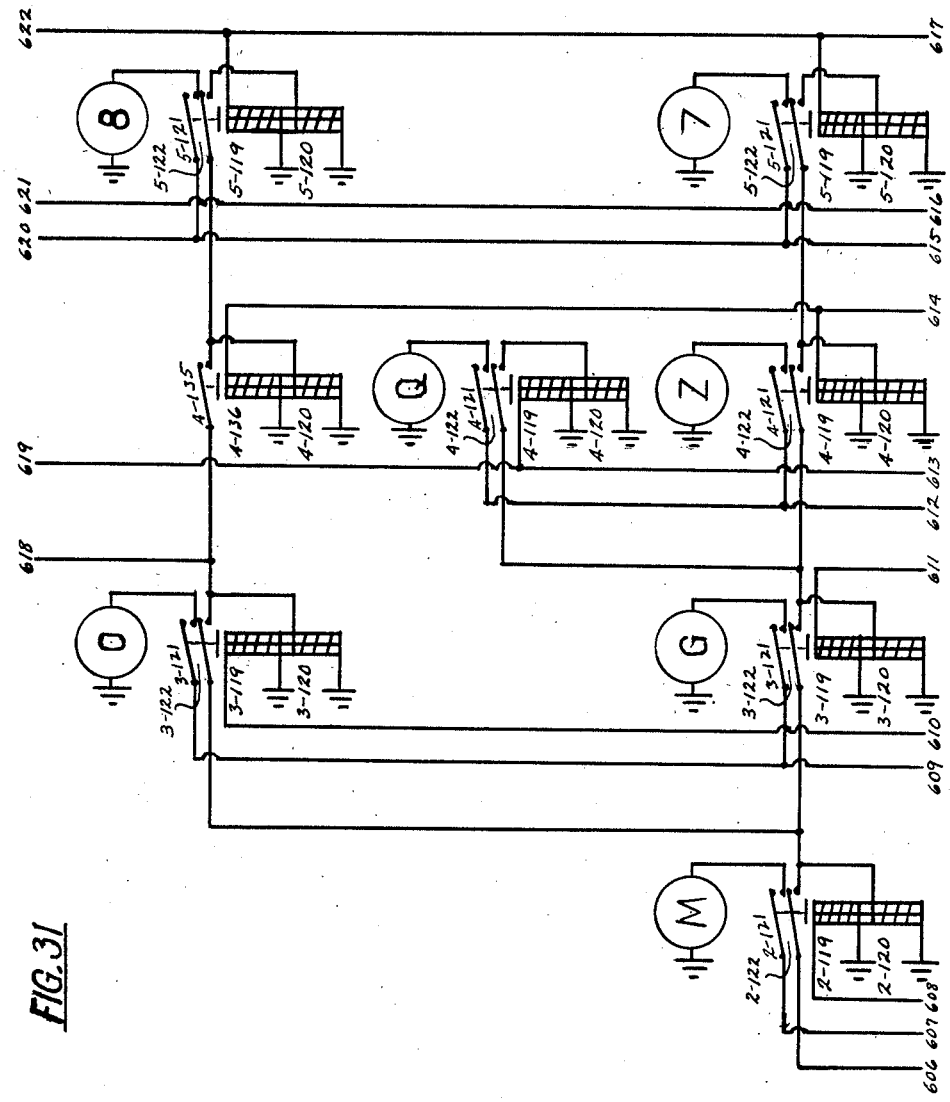
Figure 36:
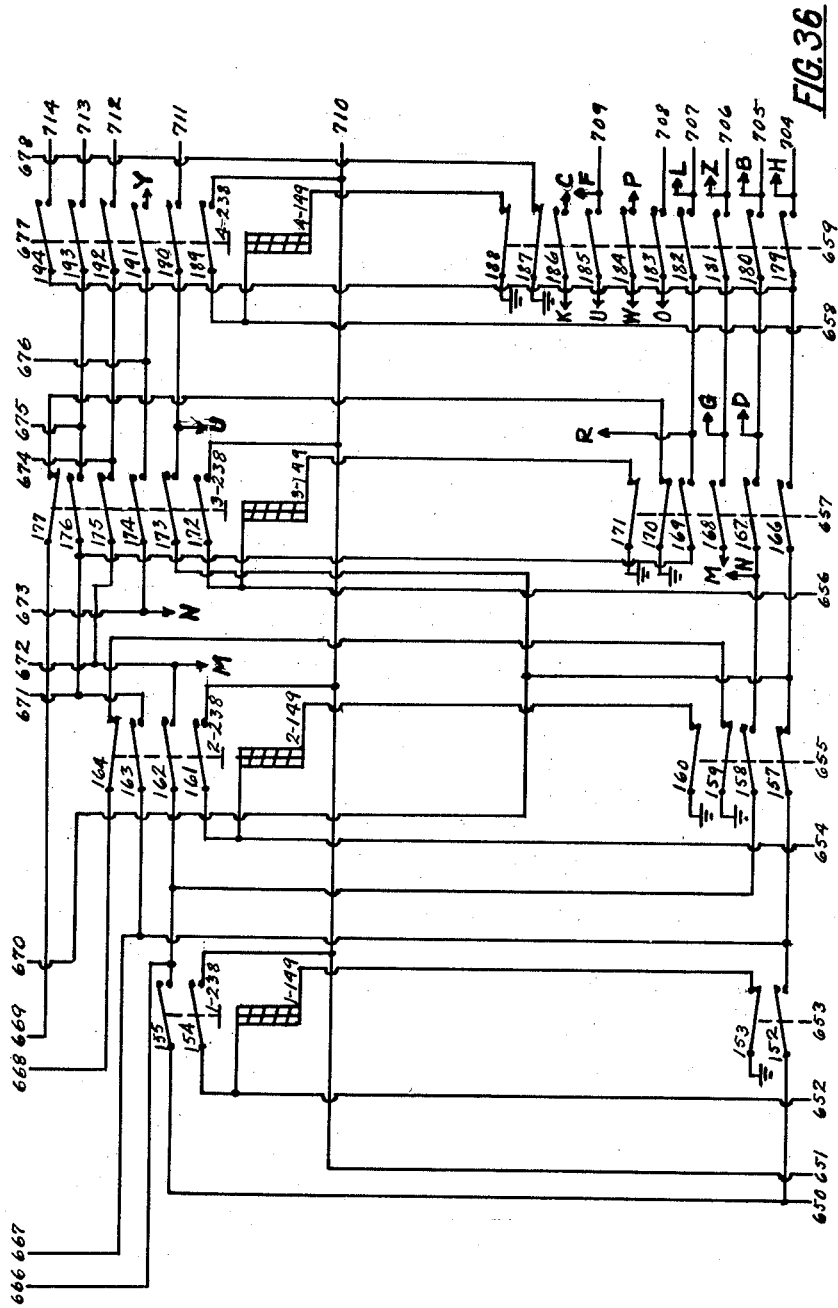
Figure 37:
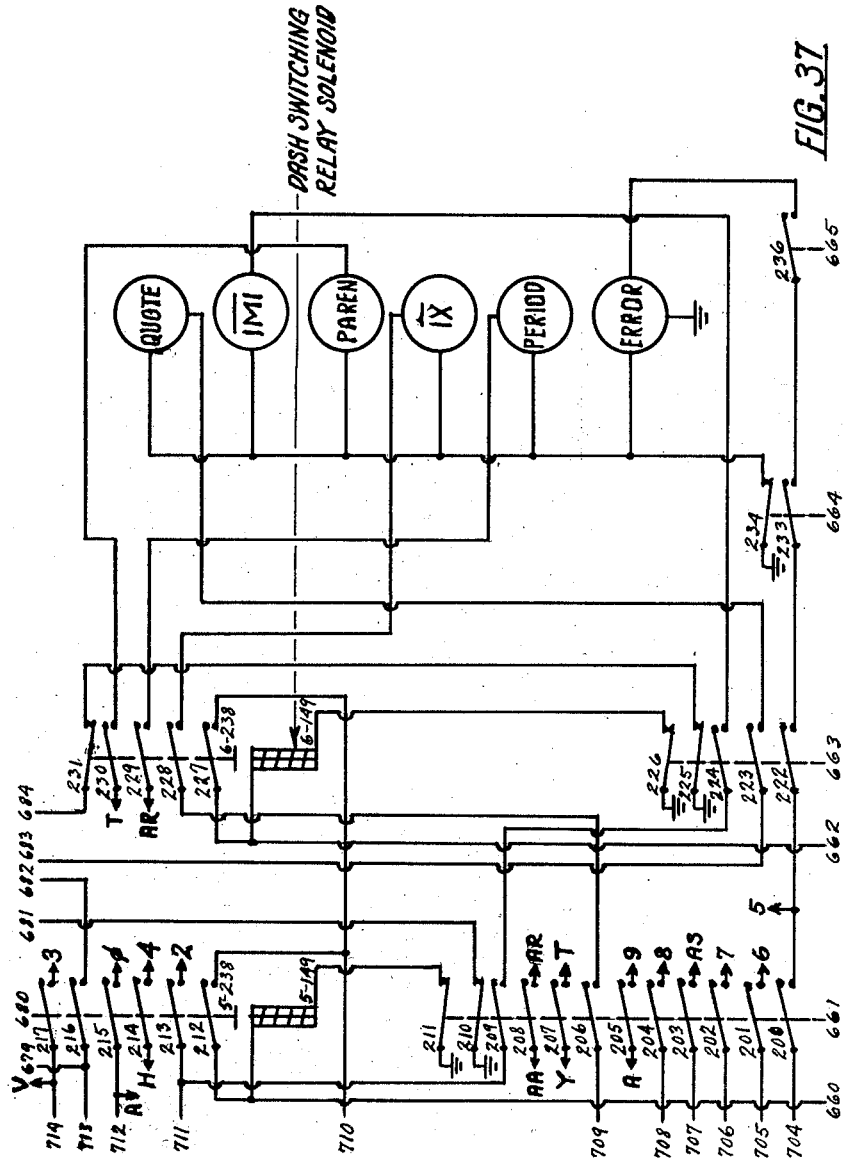
Figure 38:
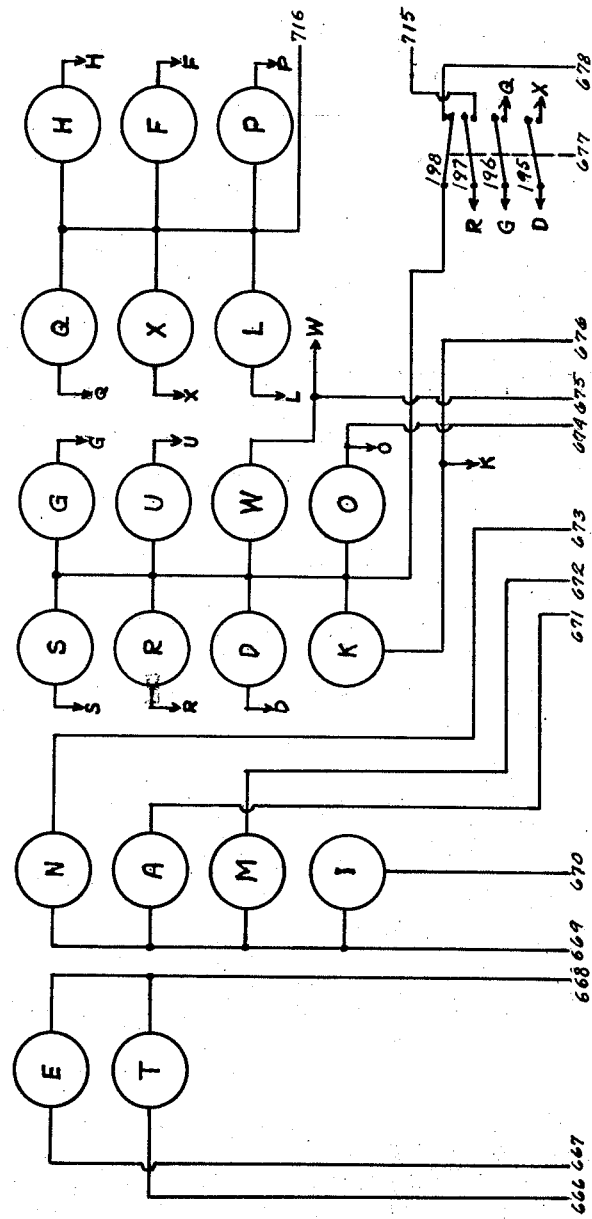

The signal circuit is caused to operate a relay 48 shown in Figure 23 which simulates the signal in the power supply circuit to the converter by the operation of contacts 47 in accordance with the signals. This arrangement allows unlimited power to be supplied from a local source to the converter in response to the relatively feeble signals.

The power requirements of the converter may best be met by a source having a poor regulation characteristic in that an initial voltage surge is desirable at the beginning of the signal to insure positive operation of the relays and after that reduced voltage, sufficient however to hold the relays locked during continuance of the signal, affords quick break of the relay contacts upon termination of the signal. To attain such characteristic, a resistor 96, Figure 20, may be inserted in the power supply circuit to limit the voltage to the minimum required for proper hold-in of the relay contacts and a condenser 95 may be placed across the supply line between the resistor and converter to provide a higher voltage when the relay is first energized. The voltage on the condenser builds up to surge value between signals and is applied at the beginning of the signal by the discharge of the condenser through the converter; during continuance of the signal the relay voltage gradually falls along the discharge curve of the condenser to a suitable value whose minimum is determined by the magnitude of resistance 96.

The power circuit to the converter preferably consists of the single circuit direct from contacts 47. A make-before-break switch supplies power to the printing circuit before the power supplied to the selector circuits is broken. This allows the device to print a character during resetting of the cams, relays and solenoids for the selection of the next character to be printed.

Figure 42 is a perspective view of the cam assembly. It is helpful to a better understanding of the invention in that it illustrates four different positions in the cycle of the selector cams 53. Cam 1—53 is shown in the latched position prior to the beginning of a signal. Switch contacts 75 to 78 are open. Cam 2—53 is shown after the termination of the signal has tripped the latch 74; switch contacts 75 to 78 are closed. Cam 3—53 is shown after the end of the signal and prior to resetting; switch contacts 75 to 78 are closed. Cam 4—53 is shown in the reset position which corresponds to the position of cam 1—53. Switch contacts 75 to 78 are open.

*Operation.—Printing and spacing cam control*

When an incoming signal is received by relay 48, contacts 47 simulates the signal in the power supply circuit of the converter, energizing relays 32, 39 and 46. The purpose of the relays and cams of Figure 13 is to exercise a control of certain circuits in accordance with the interval during and between signals as explained above.

It has been pointed out in the structural description that (a) the energization of relay 32 withdraws latch 33 from the cams, (b) the energization of relay 46 withdraws latch 45 from the cams and (c) the energization of relay 39 releases the latches 36a to 36d of the individual cams. It is important that the design of cams 13 and 50 and clutch collars 51 to slide under a given pressure enables the latches 36a to 36d of relay 39 to align the cams in an interval less than the shortest signal duration. This is necessary to ensure measurement of the shortest space interval which may follow the shortest signal. The relays are energized as long as a signal is maintained; relay 39 allows latches 36a to 36d to hold the cams in the reset position until the interval begins at the termination of the signal.

When as above stated a signal ceases and an interval begins, spring 40 of spring biased arm 38 lifts the latches 36a to 36d by moving arm 38 away from the deenergized solenoid 39. This lifting of the latches 36a to 36d allows the cams to rotate with shaft 31 in an aligned position ready to function with respect to latches 33 and 45.

Since the minimum space between the signals is the length of a dot, the latch 45 is adjusted about the periphery of the cam until the contacts 43 of the printing circuit close at such an interval that successive dots can be printed with an interval space equal to the length of a dot. This relay 46 controls the interval at which the printer will operate. Once the printer operates, the selector circuit must be deenergized to set the circuit for the next signal; this is accomplished by the make-before-break switch 41 which first closes the printer circuit for its operation and then opens the power circuit of the selector to prepare it for the next signal.

Since the intra-character spacing of the code signals is equal in length to that of a dot and this spacing is used only in a group of code signals that form a letter character to be printed, it follows that any interval longer than a dot length or greater than the position setting of latch 45 can be used to cause the printer to insert a space between printed words. The printer prints a character and at once automatically spaces for the spacing between characters. Latch 33 is adjusted about the periphery of the cams until contacts 35 closes the spacing circuit at the earliest interval at which it is desired to cause the spacer to operate. This interval for operating the spacer would normally have a minimum length equal to the length of a dash.

Selector cam control

As pointed out in the structural description of the selector switching mechanism the selector cam 53 of Figure 15 has a conductive insert 89 to close the circuit of the pairs of arcuate contacts 55 and 67. When reset and in the absence of a signal, the cam 53 is held against rotation by engagement of its stop 70 with spring biased latch 74. When a signal is received, the selector cam control solenoid 1—57 is energized through contacts 1—82 which holds latch 1—74 against spring 73 and out of engagement with cam 1—53 until the end of the signal, at which time the rotation of the cam has moved stop or lug 70 away from its normal or arrested position to an angular position dependent on the signal. At the end of the signal, spring 73 draws latch 1—74 back toward the lowered cam periphery which closes all contacts of cam-control-contact pileup 79. When contacts 1—77 of the pileup 79 are closed they energize one leg of each of the brush pairs 1—55 and 1—67, and which of these circuits is further energized depends upon the position of bridging contact 89, i. e. whether the signal is a dot or a dash. The circuits are deenergized when contacts 1—81 are opened thus preventing the dot and dash circuits from becoming energized in the same selector bank.

It has been pointed out above how cam control contact pileup 79 mechanically operates to close contacts 1—77 energizing discriminator brushes 1—55 and 1—67. Contacts 1—77 are closed, also energizing the speed control circuit by way of contacts 1—81 of the bank switching contact assembly 1—80. Contacts 1—78 are also closed energizing bank switching relay solenoid 1—86.

When the bank switching relay solenoid 1—86 is energized the armature opens contacts 1—81 and 1—82, and closes contacts 1—83 and 1—84. Contacts 1—81 open the speed control circuit and the signal discriminating circuit for the first bank, and contacts 1—82 deenergize selector cam control solenoid 1—57. Contacts 1—83 close the circuit to the selector cam control solenoid of the second bank 2—57, and contacts 1—84 lock in bank switching relay solenoid 1—86.

Speed control

Assume that a short signal is received and operates the selector cam control solenoid 1—57, closing contacts 1—77 and applying power to brushes 1—63, 1—54, 1—56 and 1—65 through contacts 1—81. If the signal is a short dot, the insert 1—88 closes the circuit at brush 1—65. If the signal is a short dash, the insert 1—88 closes the circuit at brush 1—54. Brushes 1—65 and 1—54 form a common circuit energizing solenoid 102 of the speed control device. The ratchet 104 moves slide bar 106 over resistance 100 which in turn increases the speed of the motor 107 driving shaft 31 and the cams. In brief, a short signal is interpreted as an apparent increase in code speed and therefore the rate of rotation of the cam is increased.

If, however, a long signal is received, brushes 1—66 and 1—63 are closed by a dot or dash respectively, and energize solenoid 101 of the speed control device to decrease the speed of the cam.

As the selection of signals proceeds from bank to bank, each signal not of normal length produces a speed corrective impulse which causes the speed of the converter to accommodate itself to the speed of the reception of the signal. If the signal has normal speed, there is no circuit closed through brushes 54, 63, 65 or 66 and the speed control circuit receives no impulse.

Selector system.—Circuits energized at the beginning of a signal

Because all of the possibilities of the selector system can not be set forth without needless repetition, the operation of the circuits and parts thereof are set forth in detail initially, and where subsequent repetition occurs reference is made to the initial explanation.

To render operation of the converter to great degree independent of the signal power in the receiver output, the receiver output signals are applied to relay 48, the operation of whose contacts 47 control energization of relays 32, 39, 46 and 57 from a "Power Supply" circuit, to simulate or reproduce the signals at power level suited for proper operation of the relays.

The power supply consists of one grounded and one live line connected to the converter as illustrated in Figures 23 to 32. The circuit through contacts 47 is normally open in the absence of a signal, but is closed by signal relay 48.

The circuits of the selector system that carry the line potential for the first bank are (1) from contacts 41 to open contacts 43 of the printing circuit, (2) from contacts 41 through normally closed contacts 1—81 to open contacts 1—77 of the speed control and discriminator circuits, (3) from contacts 41 to open contacts 1—78 of the bank switching relay solenoid circuit, (4) from contacts 41 to open contacts 1—84 of the locking bank switching relay solenoid circuit, (5) from contacts 41 to normally open contacts 1—117 of the printing circuit cut out relay locking circuit, (6) from contacts 41 through the printing circuit cut out relay solenoid 1—115 to open contacts 2—76, (7) from contacts 41 to open contacts 1—122 of the E character selection relay locking circuit, (8) from contacts 41 to open contacts 1—122 of the T character selection relay locking circuit. In a similar manner, the circuits carrying the potential for the successive banks may be traced out.

Consider the circuits energized at the beginning of the first signal. Contacts 47 close, energizing the printing cam control solenoid 46, the spacer circuit control solenoid 32 and the control cam reset solenoid 39 which resets the printing and spacer cams, conditioning them for functioning at the end of the signal. The closing of contacts 47 also energizes, through normally closed contacts 1—82, the selector cam control solenoid 1—57 which releases latch 1—74 permitting cam 1—53 to begin its cycle of measuring the duration of the signal.

Selector cam control solenoid 1—57 when deenergized at the end of the first signal closes normally open cam-control-contact-pileup switch 79, which now through closed contacts 1—77 places a potential on discriminating brushes 1—55 and 1—67. Normally open contacts 1—77 of the speed control circuit are closed which places a potential on one leg of each pair of brushes 65, 66, 54 and 63 of cam 1—53. Normally open contacts 1—78 are closed energizing the bank switching relay solenoid 1—86 which operates the bank switching contact assembly 1—85.

Normally open contacts 1—84 are closed through the action of bank switching contact assembly 1—85 thus energizing bank switching relay solenoid 1—86 and electrically locking the contacts of the bank switching contact assembly in their respective open and closed position. The closing of the bank switching contacts 1—83 shifts the signal circuit from the first selector bank so that the next following signal will energize the respective circuits in the second selector bank, unless the power circuit is first opened at contacts 1—41.

*Circuits energized at the end of the first signal*

At the end of the first signal, relay 48 is deenergized, contacts 47 open. The opening of contacts 47 deenergizes printing cam control solenoid 46, reset cam control solenoid 39 and spacer cam control solenoid 32, which starts cams 13 and 50 upon the measurement of the spacing interval. Latch 45 stops the printing circuit control pair of cams 50 at the end of the minimum interval as described above, unless the next signal is received earlier, and causes the printing circuit to close through contacts 43 before breaking the power circuit through contacts 41. Latch 33 stops the spacer circuit control pair of cams 13 at the end of the desired interval, and closes the spacing-between-words circuit. The spacer circuit does not function when the interval is shorter than the minimum length because the beginning of the signal that determined the shorter length resets the cams 13 and 50 and conditions this interval measuring mechanism for the next interval.

If the signal is short, brushes 65 or 54 (depending whether the signal is a dot or dash) of Figure 22 are closed by cam insert 88, energizing solenoid 102 which acts through speed control 106 and 100 to increase the speed of motor 107 to conform to the length of the signal as received by the converter.

If the signal is long, brushes 66 or 63 are closed by the cam insert 88, energizing solenoid 101, which acts through the speed control 106 and 100 to decrease the speed of the motor 107 to conform to the length of the signal as received by the converter.

If the signal is a dot the circuit between discriminating brushes 1—67 is closed by the cam insert 89 energizing the E character selection relay solenoid 1—119. The energization of the E character selection relay solenoid 1—119 closes contacts 1—121 and 1—122. The closing of contacts 1—121 causes the printing circuit to be complete to print the character E except at contacts 43. If the dot is the only signal of the code character (i. e., followed by an inter-character space) the printing circuit will close at contacts 43 thus completing the printing circuit for the letter E and the letter E will be printed. If there is a minimum interval, another signal is received before "print" contacts 43 close, they are prevented from closing because the control cams begin to reset, the letter character is therefore not printed and contacts 41 remain closed in preparation for the next following signal of the same code character. The closing of contacts 1—122 energizes the locking winding 1—120 of E character selection relay, thus holding contacts 1—121 and 1—122 closed until deenergization of the locking circuit by opening contacts 41. The contacts 1—122 also close a circuit placing a potential on normally open contacts 2—122 of the A and I character selection relays. This produces the second step of progressive selection through the selector maze beginning with a dot, as illustrated in Figure 2.

If the first signal of a character is a dash, the circuit between the discriminating brushes 1—55 is closed by the cam insert 89 energizing the T selection relay solenoid 1—119. The energization of the T selection relay solenoid closes contacts 1—121 and 1—122. The closing of the contacts 1—121 causes the printing circuit to print the character T if the character comprises only a single dash. The closing of contacts 1—122 energizes the locking winding 1—120 of the T selection relay, thus holding contacts 1—121 and 1—122 closed until deenergization of the locking winding. The contacts 1—122 also close a circuit placing a potential on normally open contacts 2—122 of the M selection relay; and normally open contacts 2—122 of the N character selection relay. This produces the second step of progressive selection through the selector maze beginning with a dash.

When the contacts 1—73 are closed at the end of the first signal, bank switching relay solenoid 1—86 is energized which operates the bank switching contact assembly 1—85, opening normally closed contacts 1—81 and 1—82 and closing normally open contacts 1—83 and 1—84. The opening of normally closed contacts 1—81 opens the speed control circuit after the speed controlling impulse for the first signal has adjusted the speed of the converter and also opens the discriminator circuit thus preventing the dash circuit from becoming energized in the same selector bank that a dot has been recognized. The opening of normally closed contacts 1—82 removes the selector cam control solenoid 1—57 of the first bank from the circuit for the second signal. The closing of contacts 1—83 places the selector cam control solenoid of the second bank in the circuit with contacts 47 of the signal relay 48, so that the second code signal of a code character group will operate the second selector bank. The closing of normally open contacts 1—84 locks the bank switching relay solenoid in the circuit until the opening of power circuit contacts 41 deenergizes and resets the selector system for identification of the next code character.

At the beginning of the first signal, the energization of the selector cam control solenoid of the first bank removed latch 1—74 from the cam allowing the cam to rotate. At the end of the first signal latch 1—74 was released by the solenoid and the latch was pulled toward cam 1—53 by spring 1—73. This action at the end of the first signal closed normally open contacts 1—77 and 1—78 of the cam control contact pileup 1—79 performing the three functions pointed out above. Cam 1—53 continues to rotate to the end of the cycle, when latch 1—74 rides up on elevation 1—72, opening contacts 1—77 and 1—78, and placing cam 1—53 in the reset position for operation on the next following code character group of code signals.

Up to this point the operation of the first bank of the selector system has been pointed out for the beginning and end of the first code signal, regardless of whether the signal was a dot or a dash. It was shown (1) that if another code signal was not received before the end of the minimum interval between signals, the letter character corresponding to the first code signal was printed and the apparatus reset for the signals of the next letter character. It was also shown (2) that if the first interval was not longer than a minimum interval, the printing circuit was not closed, the first selector bank was locked in and the second selector bank was conditioned, with the shifting of circuits and the application of potential, to be operated by the reception of the second signal.

It may be pointed out here that if the interval between signals is greater than that controlling the two conditions pointed out above, the spacer circuit is closed by spacer control cams 13 (Figures 13 and 14). The latch 33 falls in the alined notches and closes contacts 35, which sends a spacing impulse to the printer and produces the space between letter groups or words. If this spacing interval occurred after the first signal pointed out above, the printing of letter characters E or T would be typed as the end of a letter group or word.

*Circuits energized at the beginning and end of the second signal*

Contacts 1—83 are now closed since the bank switching relay solenoid is electrically locked. When the beginning of the second signal is received signal relay 48 closes contacts 47 which sends through locked contacts 1—83 and normally closed contacts 2—82 the simulated signal to the selector cam control solenoid 2—57 of the second selector bank. Latch 2—74 of the second bank is withdrawn for the duration of the signal, allowing cam 2—53 to rotate in order to discriminate between the dot and dash. At the end of the second signal the release of latch 2—74 by the solenoid allows the contacts of cam control contact pileup 2—79 to be closed.

The speed is regulated by the closure of contacts 2—77 in the second bank as was pointed out for the closure of contacts 1—77 for the first bank.

The closing of contacts 2—76 in the second bank energizes the printing circuit cut out relay 1—115 in the first bank which opens contacts 1—118 and closes contacts 1—117 of said relay. The opening of contacts 1—118 removes the potential from the printing circuits of the E and T character selection relays of the first bank, so that possible subsequent action of printing contacts 43 by the second signal will not cause the E and T characters to print. The closing of contacts 1—117 energizes locking coil 1—116 which holds the contacts 1—117 and 1—118 in this position until deenergization which is accomplished at the time the power circuit is opened by contacts 41.

The closing of contacts 2—77 places a potential on one leg of each pair of discriminating brushes 2—55 and 2—67. If the signal is a dot, the I and N character selection relay solenoids are energized, closing contacts 2—121 and 2—122 of each which function respectively in the manner set forth for contacts 1—121 and 1—122 of the E character selection relay. If the signal is a dash, the A and M character selection relay solenoids are energized, closing contacts 2—121 and 2—122 of each which function respectively in the manner set forth for contacts 1—121 and 1—122 of the E character selection relay.

The closing of contacts 2—73 energizes the second bank switching relay solenoid 2—86 which operates on the contacts of the second bank switching contact assembly 2—85 in the same manner as the closing of contacts 1—78 of the first bank switching relay actuated the contacts of the first bank switching contact assembly 1—85.

*Circuits energized at the end of the second interval*

If the second interval is not longer than a minimum interval the printing control cams 50 are reset before the printing circuit is closed. The E or T and respectively the I and A or N and M character selection relays of the second bank are locked, which at the same time applies a potential to the open contacts of the S, U, R and W or D, K, G and O character selection relays respectively of the third bank. The printing circuit cut out relay 2—115 of the second bank is locked which opens the printing circuit of the I, A, N and M character selection relays of the second bank so that the possibility of their operation by the third signal is removed. The energizing of the second bank switching solenoid 2—86 and the operation of the bank switching contact assembly 2—85 prepares the third bank for the reception of the third signal. It should be clear at this point how the successive code signals comprising a character operate upon particular banks in sequence to select the circuits corresponding with a character before that character is printed. It is evident from Figures 23 to 32 the maximum number of banks, or number of code signals required, for a letter character of the International Morse Code is eight, because the character "Error" comprises eight signals, specifically eight dots.

If the second interval is longer than an intra-character space, the printing control cams 50 operate to close the printing circuit at contacts 43. If the two signals are two dots and printing circuit is closed after the second interval, the character I is printed. If the two signals are a dot and a dash, the character A is printed. If the two signals are two dashes, the character M is printed. If the two signals are a dash and a dot, the character N is printed. It should be clear at this point how a letter character is printed when the code signals determining that character are followed by a printing interval.

If the interval occuring after the second signal is greater than the space between characters of the same word one of the characters of the second bank, such as I, A, N or M, is printed as the end of the word, the space bar advancing the tape or page for beginning of the next word.

Further discussion of Figures 23 to 32 is omitted because it would be unnecessary repetition.

It is clear that if any character is improperly terminated an additional character selection relay may be provided in the next following selector bank after the last proper code character in each sequence and the printing circuit of these relays may be connected to any selected character, for example "Error" to indicate where in the message text an improperly terminated character was received.

Alternatively, if the printing circuit cut-out relay for the last possible code character in each sequence is omitted, the letter character determined by the sequence less the last possible code character will be printed upon reception of an improperly terminated character.

An alternative selector circuit is illustrated in Figures 34 to 39 to be combined in accordance with the diagram of Figure 40. The apparatus of this alternative is similar to that disclosed in Figures 23 to 33 in that the selector cams, the selector-cam control solenoid and contacts, and the bank-switching relay, solenoid and contacts are substantially identical. The alternative system differs from that of Figures 23 to 33 in that some relays are omitted and their functions performed by incorporation of circuits controlled by additional contacts of the remaining relays. The alternative circuit design permits the converter to be more compactly constructed, because requiring lesser number of relays, but the speed of operation of the remaining relays and therefore the maximum speed of the converter is reduced.

It will be noted from Figure 34 that in the alternative circuit, the printing and spacing cams 50, illustrated in Figures 13 and 14, and their relays function as in Figures 23 to 33. This similarity of function may also be noted for the speed control circuit (not shown in Figure 34) and the selector cams.

The principles involved in this alternative circuit are essentially the same in all respects as those of the circuit of Figures 23 to 33. Individual character selection relays, 1—120 to 8—120, are employed in the circuit of Figures 23 to 33 wherein all of the character selection relays for each dot and dash of each selector bank are energized simultaneously, thus closing their respective printing circuit contacts. In the alternative circuit of Figures 34 to 40, the printing circuit contacts are combined so that one relay in each selector bank closes all of the contacts for dots and one relay closes all of the contacts for dashes. The printing circuit cut-out switches are also incorporated in both the dot and dash character selection relays of each bank.

The operation of the alternative structure will be discussed in the following paragraphs according to the reception of code signals to be converted.

*Beginning of the first signal*

At the beginning of the first signal, signal supply relay solenoid 48 closes contacts 47 in the power circuit and simulates the signal therein.

Spacing and printing relay solenoids 46, 32 and 39 function, in the manner previously pointed out, to reset cams 50 and 13 for measurement of the interval following each signal. Contacts 41 are normally closed and contacts 43 are normally open. The closure of contacts 41, which remain closed except after printing when opened to reset the selector switching relays, places a potential on contacts 43, on normally closed contacts 1—81 to 8—81 of the bank switching relays 1—86 to 8—86 and normally open contacts 1—77 to 8—77 of the cam operated switches 1—74 to 8—74, on normally open contacts 1—84 to 8—84 of the bank switching relays on open contacts 1—78 to 8—78 of the cam operated switches 1—74 to 8—74, on normally open contacts 1—75 to 8—75 of the cam operated switches 1—74 to 8—74, on normally open contacts 151, 156, 165, 178, 199, 221, 232, and 235 of dot switching relays 1—150 to 8—150, and on open contacts 154, 161, 172, 189, 212 and 227 of dash switching relays 1—149 to 6—149. Such is the electrical condition of the circuits at the instant of the beginning of the first signal but just before operation of the converter begins.

Simultaneously with the beginning of the resetting of the space and printing cams and the conditioning of the circuit, the beginning of the first signal passes through normally closed contacts 1—82 of the first bank switching relay and energizes the first selector cam control solenoid 1—57. This energization of the cam control solenoid releases latch 1—74 permitting the cam 1—53 to start rotation to measure the duration of the signal.

The speed of the converter is controlled by the length of the incoming signals in the same manner as previously explained in connection with Figure 22. The speed control circuit is energized through contacts 1—81 and 1—77, the contacts 1—77 initiating the impulse upon closing and contacts 1—81 terminating it upon opening.

*End of first signal*

When the first signal terminates, contacts 47 of signal relay 48 open; this deenergizes solenoids 46, 32 and 39 of the spacing and printing relays and starts the measurement of the interval between signals as previously discussed herein.

Upon opening of contacts 47, the deenergization of first selector cam control solenoid 1—57 releases latch 1—74 and thereby closes contacts 1—77, 1—75 and 1—78. The closing of contacts 1—77 initiates the speed control impulse. The closing of contacts 1—75 places a potential on the discriminating brushes 1—55 and 1—67 for the identification of the signal as a dot or a dash. The closure of contacts 1—78 energizes the bank switching relay solenoid 1—86 which opens contacts 1—81 and 1—82 and closes contacts 1—83 and 1—84 thereof.

The opening of contacts 1—81 terminates the speed control impulse. The opening of contacts 1—82 deenergizes the selector cam control solenoid 1—57, releasing the latch 1—74 and so permitting it to ride upon the circular portion of the cam with the contacts closed until the cam is reset at the end of the rotation. The contacts are opened when the latch 1—74 rides up on raised portion 72, Figure 15, and latches the cam against lug 70. The closed contacts 2—82 and solenoid 2—57 of the second bank selector cam complete the power circuit for operation by the second signal. The closing of contacts 1—34 locks the bank switching relay solenoid 1—86 until the signal sequence has been printed and the power circuit opened by contacts 41.

If the first signal is a dot the circuit through brushes 1—67 is completed by contact 89, which energizes the solenoid 1—150 of the dot-selecting relay thus opening contacts 153 and closing contacts 152 and 151. The opening of contacts 153 prevents the energization of the dash selecting relay solenoid 1—149. The closing of contacts 152 places a printing potential upon normally open contacts 157 of the second bank dot selecting relay 2—150, on normally open contacts 163 of the second bank dash selecting relay 2—149 and on the E character. The closing of contacts 151 locks solenoid 1—150 of the first bank dot selecting relay in the operated position. The circuit of the character E is completed through normally closed contacts 164 of the second bank dash selecting relay and normally closed contacts 159 of the second bank dot selecting relay. If either of the above relays operate, the E character circuit is opened, thus preventing this circuit from printing the character in this particular sequence of code signals.

If the first signal is a dash the circuit through brushes 1—55 is completed by contact 89, which energizes the solenoid 1—149 of the dash selecting relay, closing contacts 154 and 155. The closing of contacts 154 locks solenoid 1—149 of the first bank dash selecting relay in the operated position. The closing of contacts 155 places a printing potential on the T circuit and on normally open contacts 158 and 162 of the second bank dot and dash selecting relays respectively. The T circuit is completed through normally closed contacts 164 and 159 of the second bank dash and dot selecting relays respectively. If either of the above relays operate, the T circuit is opened, thus preventing this circuit from printing the character in this particular sequence of code signals.

*End of the first interval*

If the first interval is an intra-character space the printing and spacing cams are reset before the printing and spacing circuits are energized. It has been pointed out how the operation of contacts 1—84 of the first bank switching relay locks said relay in the operated position, thus conditioning the second band for operation upon reception of the second signal.

If the first interval is a printing interval, the contacts 43 of the printing relay are closed establishing a printing potential, which will operate either the E or T character circuits, depending upon whether the signal has been identified a dot or a dash. The operation of the character circuits causes the printer to print that letter character represented by that character circuit.

If the first interval is greater than the printing interval, the character selected will be printed and in addition the spacing circuit will be energized causing the printer to space after printing, thus ending a word or preparing to start another word.

*The second signal*

When the contacts 47 are closed at the beginning of the second signal, the spacing and printing cams are reset in preparation for the second interval and their second cycle. The first bank switching relay contacts are now locked in the operated position so that the second signal passes through closed contacts 1—83 and 2—82 to energize the solenoid 2—57 of the second bank selector cam control. The second bank selector cam control and bank switching relay are operated by the second signal in the same manner as the first bank selector cam control and bank switching relay are operated by the first signal.

If the second signal of the same character is a dot, the solenoid 2—150 of the second bank dot selecting relay is energized, closing contacts 156, 157, 158 and opening contacts 159 and 160. The closing of contacts 156 locks the second bank dot selecting relay in the operated position. The closing of contacts 157 places a printing potential on normally open contacts 166 and 173 of the third bank dot and dash selecting relays respectively and on the I circuit. The I circuit is completed through the normally closed contacts 177 and 170 of the third bank dash and dot selecting relays respectively.

If the second signal of the same character is a dash, the solenoid 2—149 of the second bank dash-selecting relay is energized, closing contacts 161, 162, 163 and opening contacts 164. The closing of contacts 161 locks the second bank dash selecting relay in the operated position. The closing of normally open contacts 162 places a printing potential on the M circuit which is completed through normally closed contacts 177 and 170 of the third bank dash and dot selecting relays respectively, and on normally open contacts 168 and 175 of the third bank dot and dash selecting relays respectively.

The second interval operates in a manner similar to the first interval, to perform the function indicated by its duration. If the interval is a minimum or intracharacter interval, no spacing or printing occurs, and the third bank is conditioned for operation by the third signal of the same character. If the interval is a printing interval, the characters I, A, N or M will be printed depending upon whether the first and second signals were dots or dashes. If an interval greater than the printing interval occurs, the selected character is printed and a space is made by the printer as previously pointed out.

Each successive signal and interval of a character may be traced out on the circuit and cams of Figures 34 to 39, until the sequence of signals is exhausted or has been completely covered for the code character. All features of the device have been covered at least once in explanation and discussion, so that the operation thereof is obvious for any other sequence of signals of a code. The normally closed contacts 159, 164, 170, 177, 187, 198, 210, 220, 226, 231 and 234 open printing circuits for all characters of the preceding selector bank. This provision for opening the various printer circuits allows only one possible closed circuit through the selector maze at any one time.

We claim:

1. A converter for interposition between a source of signals and a printing device comprising means including a structure rotatable always in one direction for measuring the duration of the individual signals, and means responsive to departure from normal length of a signal for changing the speed of said structure.

2. A converter for interposition between a source of signals and a printing device comprising means including a structure rotating always in one direction for measuring the duration of the individual signals and intervals, and means responsive to the departure from the normal length of a signal for changing the speed of said rotating structure.

3. A converter for interposition between a source of signals and a printing device comprising means including a rotating structure for measuring the duration of individual signals, means for changing the speed of said structure responsive within ranges of unduly increased and decreased signal lengths and non-responsive within another range of signal lengths, and means for varying the extent of one of said ranges.

4. A converted for interposition between a source of signals and a printing device, comprising movable means for measuring the duration of individual signals, means responsive to departure from normal length of a signal for changing the speed of said measuring means, and means for varying the extent to which said responsive means may vary the speed of said measuring means in response to departure from normal length of a signal.

5. A converter for interposition between a source of signals and a printing device, comprising movable means for measuring the duration of individual signals, means for changing the speed of said measuring means responsive to undue increase or decrease in length of said signals and non-responsive within a range of signal lengths, and means for varying the extent of said range.

6. A converter for interposition between a source of signals and a printing device, comprising movable means for measuring the duration of individual signals, means for changing the speed of said measuring means responsive within ranges of unduly increased and decreased signal lengths and non-responsive within another range of signal lengths, and means for varying the extent of one of said ranges.

7. Apparatus for controlling electrical circuits responsive to irregularly spaced electrical impulses, comprising means including a pair of cams adjacently rotatable wherein each cam of said pair is independently rotatable and independently arrestable from rotation, each cam having notches about its periphery and one cam of said pair having one more notch than the other cam of said pair so that only a notch of each cam of said pair of cams can be in simultaneous alignment, a latch engageable with both cams simultaneously only when a notch of each cam is positioned in alignment for simultaneous engagement, separate latches engageable with each cam to independently arrest rotation of each cam and align notches of both cams for engagement by first said latch toward the periphery of the two cams and to urge the said separate latches away from the periphery of their respective cams, a means to reverse the direction of the urge of all latches in response to and for the duration of an electrical current, a switch actuated in response to movement of first said latch to close an electrical circuit at the time said latch moves into an engaged position within the aligned notches of said two cams and conversely opens said circuit at the time of disengagement of said latch with the notches of said two cams, and the said cams independently arrestable from rotation by engagement of any of said latches and conversely releasable for rotation upon disengagement of said latches.

8. Apparatus for converting received telegraphic code signals directly into printed words, comprising means including two pairs of rotatable cams constructed to be independently latch arrestable from rotation and constructed to be reset for rotation in less than the time required for the duration of a short signal, latch means responsive to signals for resetting the cams preparatory to measuring relative code space lengths as represented by amount of angular movement of said cams prior to the beginning of a signal, latch means responsive to signals for controlling rotation of one pair of independently arrestable from rotation but concurrently releasable and rotatable cams so spaced from the resetting latch means to close a spacing circuit at termination of a time interval whose length indicates a space between words, latch means responsive to signals for controlling rotation of a second pair of independently arrestable from rotation but concurrently releasable and rotatable cams so spaced from the resetting latch means with a dual purpose to close a printing circuit at termination of a time interval whose length is greater than an intra-character code space and to reset selector means prior to the beginning of the next following signal, selector means for selecting code characters, and means for printing letter characters represented by selected code characters.

9. Apparatus for converting received telegraphic code signals directly into printed words, comprising means continuously rotating in one direction, cam means frictionally driven by said continuously rotating means and capable of being arrested from rotation to a reset position preparatory for release for rotation in less than a time interval equivalent to a short signal, selector means for selecting code characters, means responsive to a mark signal for resetting the said cam means preparatory for release for rotation at occurrence of a space signal, latch means responsive to a signal and said cam means arcuately positioned from the said resetting means to close a spacing circuit of a printer at occurrence of an inter-word code space, latch means responsive to a signal and said cam means arcuately positioned from the said resetting means to close a printing circuit of a printer at occurrence of an inter-character code space and to immediately open a selector circuit for resetting said selector means, and means for printing letter characters represented by selected code characters.

10. A converter for interposition between a source of code signals and a printing device, comprising means including a plurality of rotatable circuit controlling members in number corresponding with the greatest number of signals comprising a code character, means responsive to the successive signals of each code character sequentially to effect rotation of a number of said members corresponding with the number of signals comprising that code character and to effect control of the respective circuit by each member to an extent corresponding with the duration of the corresponding signal, and an electrical network including said rotatable circuit controlling members for selective energization at beginning and termination of each signal of a number of electrical means to effect character selection and synchronization of converter speed with the number and duration of signals in said code character.

11. A converter for interposition between a source of code signals and a printing device, comprising means including a plurality of continuously rotatable circuit controlling members in number corresponding with the greatest number of signals comprising a code character, means responsive to the successive signals of each code character sequentially to effect rotation of a number of said members corresponding with the number of signals comprising that code character and to effect control of the respective circuit by each member to an extent corresponding with the duration of the corresponding signal, and an electrical network including said rotatable circuit controlling members for selective energization at beginning and termination of each signal of a number of electrical means to effect letter character selection and synchronization of converter speed with the number and duration of signals in said code character.

12. A converter for interposition between a source of code signals and a printing device, comprising means including a plurality of unidirectionally rotatable circuit controlling members in number corresponding with the greatest number of signals comprising a code character, means responsive to the successive signals of each code character sequentially to effect rotation of a number of said members corresponding with the number of signals comprising that code character and to effect control of the respective circuit by each member to an extent corresponding with the duration of the corresponding signal, and an electrical network including said rotatable circuit controlling members for selective energization at beginning and termination of each signal of a number of said electrical means to effect letter character selection and synchronization of converter speed with the number and duration of signals in said code character.

13. A converter for interposition between a source of signals and a printing device, comprising means including a rotating structure for measuring the duration of individual signals, means for measuring the duration of spaces between signals, means responsive to departure from normal length of a signal for changing the speed of said structure, and means for varying the extent to which said responsive means may vary the speed of said structure per revolution thereof.

14. A converter for interposition between a source of signals and a printing device, comprising means including a rotating structure for measuring the duration of individual signals, means for measuring the duration of spaces between signals, means for changing the speed of said structure responsive to undue increase or decrease in length of said signals and non-responsive within a range of signal lengths, and means for varying the extent of said range.

15. Apparatus for converting telegraphic code signals directly into printed words, comprising: a source of code signals; a power circuit; means for simulating the signals in said power circuit; a first relay responsive to said signals; driving means; speed regulating means for said driving means; a first discriminating cam actuable by said driving means and releasable by said first relay for rotation in response to the beginning of a simulated signal, operative to select a code signal and to control said speed regulating means in accordance with the speed of the received signals; a second discriminating cam actuable by said driving means; a multicontact switch operated in response to termination of the simulated signal; a printing circuit conditioned by said multicontact switch; a bank switching relay operable by said multicontact switch to reset said first cam and condition said second cam for a following signal; a printing relay switch and cam actuable by said driving means for closing said printing circuit upon occurrence of an intercharacter interval and for resetting the bank switching relays after printing of a character; a spacing relay switch and cam actuable by said driving means and operated in response to occurrence of an interword space; a resetting relay switch for said printing and spacing cams; character selection relays operated by said discriminating and printing cams; printing cut-out relays for locking out the relays not selected for a given character; and a printer to print and space the letter characters in accordance with the operations of said relays and cams.

16. Apparatus for converting telegraphic code signals directly into printed words, comprising: a source of code signals; a power circuit; means for simulating the signals in said power circuit; driving means; speed regulating means for said driving means; a discriminating bank for each code character including a bank switching relay, character selection relays and a discriminating cam means actuable by said driving means and releasable for angular movement by a discriminating cam relay in response to the beginning of a signal, operative to select a code signal and to control said speed regulating means; a second discriminating bank; a first multicontact switch operated by said discriminating cam in response to the termination of a signal to energize said character selection relays, a printing circuit cut-out relay means, the speed control apparatus, the bank switching relay and to reset the discriminating cam; a second multicontact switch operated by the bank switching relay to disconnect the speed regulating means, the discriminating cam relay, energize the discriminating cam relay of the second discriminating bank and to lock the bank switching relay; relay switch means responsive to said signals; a pair of spacer cams controlled by said relay switch means to deliver a spacing code as determined by the interval between code characters; a pair of printing cams controlled by said relay switch means to deliver a printing impulse and to reset the discriminating bank; printing circuits to receive said printing impulse; cut-out relay means therefor operated by the second bank to break and printing circuits of the first bank; and a printing apparatus operable in response to the printing impulses of the character selection relays and the spacing impulses.

17. Apparatus for converting received telegraphic code signals directly into printed words, comprising: a source of code signals; a power circuit; means for simulating the signals in said power circuit; driving means; speed regulating means for said driving means for varying the speed of same in accordance with the variation of the speed of transmission of said signals; a plurality of discriminating banks in said power circuit for each code character respectively to print the letter characters controlled by a bank or to lock the code characters out of the bank and to condition another bank for operation; printing and spacing circuits associated with said power circuit; relay switch means responsive to said signals; two pairs of cams each controlled by said relay switch means and driven by said driving means for selecting and closing said circuits respectively; and a printing apparatus for actuation upon receipt of the printing and spacing impulses.

18. In an apparatus having discriminating and speed control circuits for converting received telegraphic code signals directly into printed words comprising: a code element discriminating circuit for distinguishing code elements and selecting a letter control circuit to condition same for a letter printing operation, a rotatable circular discriminating cam having a raised portion on its periphery and a stop thereon, a variable speed motor, a motor speed control circuit for controlling the speed of said motor in accordance with the speed of the received signal elements, said cam having two inserts for closing said discriminating and speed control circuits therethrough; signal operated spring biased latch means slidingly engageable with the periphery of said cam, operable to cause said cam to be latched against the stop at the end of one revolution in the absence of a signal and operable to cause said cam to be released for rotation at the beginning of a signal; and a switch bank actuable by said latch normally held open circuited when the cam is engaged with the raised portion and closed when the latch is engaged with the circular portion.

19. Apparatus for connecting received telegraphic code signals directly into printed words comprising letter selector control circuits for selecting the letter to be printed, a rotatable discriminating cam having a raised portion on its periphery and a stop means thereon and having two contact closing inserts, a variable speed motor for rotating said cam, a speed control circuit for controlling the speed of said motor, first brush means associated with one of said inserts to close and energize said speed control circuit at termination of a signal having an abnormal duration to vary the speed of said motor in accordance with the speed of reception of the coded signals, a second brush means associated with the other of said inserts to close and energize some of said letter selector control circuits at the termination of a signal, spring biased latch means engageable with said cam periphery operable to be lifted by said raised portion and latched against said stop, a switch bank having contacts in said letter selector control circuit, a switch bank controlling armature connected to said latch means, a solenoid for actuating said latch means, whereby said switch bank is normally held open circuited both when the cam is held latched and for the duration of a signal when released for rotation at the beginning of a signal but whose contacts are closed when the said spring biased latch means released at termination of a signal prior to completion of a revolution of said cam.

20. Apparatus for converting received telegraphic code signals directly into printed words comprising letter selector control circuits for selecting the letter to be printed, a rotatable generally circular discriminating cam having a raised portion on its periphery and a stop means thereon and having circuit closing contacts carried by said cam, a variable speed motor for rotating said cam, a speed control circuit for controlling the speed of said motor, brush means to close and energize some of said letter control circuits at termination of a signal and to close and energize said speed control circuit at the termination of a signal having an abnormal duration to vary the speed of said motor in accordance with the speed of reception of the coded signals, signal operated spring biased latch means slidably engageable with the said cam periphery operable to be lifted by said raised portion and latched against said stop means, a multiple contact switch connected to said latch means as a switch controlling armature and having contacts in said letter control circuits, said switch bank normally held open circuited when the cam is held latched against said stop means and when released for rotation by the beginning of a signal, but whose contacts are closed when said latch means is released at termination of a signal to fall on the circular portion of said cam.

21. Apparatus for converting received telegraphic code signals into printed words, comprising a first rotatable control cam structure for controlling the printing and spacing of the letters to be printed, a printing control circuit, a spacing control circuit, a plurality of switch means operated by said cam structure when a respective lever contact portion thereof is in contact with the periphery of said cam structure at respective portions of the revolution thereof for energizing said printing and control circuits at fixed instants of time relative to a single revolution of said cam structure, means setting said cam structure to a reference position during the reception of a code character, control means starting said cam structure in rotation at a fixed speed in a given direction at the end of a code character, means coupled to said respective lever portions of said switch means for removing same from contact with the periphery of said cam structure during reception of a code signal whereby the associated spacing and printing circuits controlled by said switch means will not be actuated unless the time interval between reception of a signal indicates that said respective control circuits should be energized.

22. A converter for interposition between a source of coded signals and a code responsive device comprising a rotatable cam, a relay means, latch means controlled by said relay means for releasing said cam for rotation in a given direction upon energization of said relay means by a signal from said source of signals, means coupling the output of said signal source to said relay means, said latch means stopping said cam from rotation only after said cam has completed a revolution, a conductive segment on said cam, a first pair of stationary contacts located adjacent said cam which are bridged by said conductive segment when said segment has traversed an angle which is less than the predetermined normal duration of a signal code element, a second pair of stationary contacts located adjacent said cam which are bridged by said conductive segment when said segment has traversed an angle which is greater than the predetermined normal duration of a signal code element, a constant speed motor for rotating said cam in only one direction, motor speed control means electrically coupled to one of the respective contacts of both of said first and second pairs of contacts operative to increase the speed of said motor upon the presence of a voltage on the said latter contact of said first pair of contacts and operative to decrease the speed of said motor upon the presence of a voltage upon said latter contact of said second pair of contacts, a source of energizing voltage for said motor speed control means, a switch means coupled between said source of energizing voltage and the other respective contact of said first and second pair of contacts, relay means for closing said latter switch means in the absence of a signal whereby said motor speed control means is operable only at the termination of a signal code element.

23. The combination of claim 8 characterized by a plurality of notches on the periphery of each of said cams displaced less than 90 degrees from the notches on either side thereof, the notch placement in each related pair of cams differing so that only one pair of notches in each pair of cams may be in simultaneous alignment, said second and third mentioned latch means running along the periphery respectively of said first and second pairs of cams, respective switch means actuated by said second and third latch means when said respective latch means engage the aligned notches of the associated cam pairs, the actuation of said switch means closing the said respective spacing and printing circuits, said first mentioned latch means including separate latch elements for each cam which separately lock the cams from rotation in less than 90 degrees of rotation thereof upon occurrence of a signal.

24. Apparatus for converting received telegraphic code signals directly into printed words comprising a first and second switch means, a letter printing and letter spacing control circuit whose energization is controlled by said respective first and second switch means, an intercharacter rotatable timing cam means for energizing said letter printing control circuit upon actuation of said first switch means after said cam means has rotated a number of degrees from a reference position indicating an inter-letter space and for energizing said letter spacing control circuit upon actuation of said second switch means after said cam means has rotated a number of degrees from a reference position indicating an interword space, means for setting said cam means to said reference position during reception of a code signal, means for causing said cam means to rotate in a given direction beginning with the end of a code signal, a plurality of signal discriminating cams each including a projecting portion and equal in number to the maximum number of code elements making up the longest code character, respective switch means associated with each signal discriminating cam, respective selector control circuits energized through contacts of said respective switch means including lever portions slidable along the periphery of said respective discriminator cams which lock said respective discriminator cams from rotation when engaging said projecting portions thereof, said respective switch means being actuated when said lever portions are in contact with the non-projecting portions of the periphery of the associated cam thereby energizing the particular letter selector control circuit indicated by the code elements already received, respective relay means associated with each discriminator cam for removing, when energized, said lever portions of said switch means from the periphery of the associated cam to allow rotation thereof and to prevent actuation of said respective switch means until the end of a code element, said respective relay means becoming successively energized in a predetermined order by successive code elements of a code character beginning with the reception of the first code element thereof, means for causing the energization of the respective relay means to occur only for the duration of the related code character, means responsive to actuation of said first switch means associated with said intercharacter timing cam means for de-energizing said latter respective control means to bring to an end the successive operation thereof whereby the said relays are conditioned for the reception of the next code character.

25. The apparatus of claim 24 characterized by means on said respective discriminating cams for indicating the length of the code element received, means coupled to said latter means and to the switch means associated therewith for selecting the letter selector control circuit to be energized.

26. The apparatus of claim 25 characterized by means for varying the speed of all of said cams with the speed of reception of the code signals.

27. Apparatus for use in a system wherein received telegraphic code signals including dot and dash elements actuate particular control circuits, the combination comprising a code element discriminating circuit including a rotatable cam having a raised portion thereon, a multicontact switch means, a plurality of control circuits energized through the contacts of said switch means, said switch means including a lever means movable into contact with periphery of said cam which locks said cam from rotation when engaging said raised portion of said cam, said switch means being actuated when said lever means is in contact with the non-raised portions of said cam, a first pair of stationary arcuate conductive segments located adjacent said cam, a conductive segment on said cam for making contact across said conductive segments during the portions of the rotation thereof indicating reception of a dot code element, a second pair of conductive stationary arcuate segments located adjacent said cam and displaced from said first pair of arcuate segments and bridged by the said conductive segment on said cam during the portion of the rotation thereof indicating reception of a dash code element, said respective control circuits coupled to one of the arcuate segments respectively of said first and second pair of arcuate conductive segments, means coupling the other segments of said pairs of arcuate conductive segments through the said switch means to an energizing voltage source for energizing the control circuits which upon actuation of said switch means is coupled to said voltage source through one of said pairs of arcuate segments, relay means associated with said cam for removing said lever means from periphery of said cam upon energization thereof by a code element signal to allow rotation thereof.

28. Apparatus for use in a system wherein received code signals including dot and dash elements actuate particular control circuits comprising the combination of a plurality of signal discriminating cams each including a raised portion and equal in number to the maximum number of code elements making up the longest code character, respective multi-control switch means associated with each signal discriminating cam, several selector control circuits energized through the contacts of said respective switch means, said respective switch means including a lever slidable along the periphery of said respective discriminator cams which lock said respective cams from rotation when engaging the said raised portions thereof, said respective switch means being actuated when said lever means is in contact with the non-raised portion of the associated cam, a first pair of stationary arcuate conductive segments located adjacent each of said cams, a conductive segment on each of said cams for bridging said conductive segments during the portion of the rotation thereof indicating reception of a dot code element, a second pair of conductive stationary arcuate segments located adjacent each cam and displaced from a respective one of said first pair of arcuate segments and bridged by the said conductive segment on the respective cam during the portion thereof indicating reception of a dash code element, the respective control circuits associated with each cam coupled to one of the associated stationary arcuate segments related to the code element to which it is to be responsive, respective means coupling the other respective stationary arcuate segments associated with said respective cams through a contact of the associated switch means to an energizing voltage source for energizing the associated control circuit which upon actuation of the associated switch means is coupled to said voltage source through one of the associated pairs of arcuate segments, respective relay means associated with each discriminator cam for removing said lever of said respective switch means from the periphery of the associated cam to allow rotation thereof and to prevent actuation of said respective switch means until the end of a code element, said respective relay means becoming successively energized in a predetermined order by the successive code elements of a code character beginning with the receipt of the first code element thereof, means for causing the energization of the respective relay means to occur only for the duration of the related code character.

LEANDER M. WEIR.
CASPER J. WEIR, Jr.

References Cited in the file of this patent

UNITED STATES PATENTS

| Number | Name | Date |
|---|---|---|
| 1,353,368 | Williams | Sept. 21, 1920 |
| 1,597,763 | Chauveau | Aug. 31, 1926 |
| 1,723,250 | Penot | Aug. 6, 1929 |
| 1,805,114 | Tevis | May 12, 1931 |
| 2,267,409 | Massini | Dec. 23, 1941 |
| 2,323,155 | Rose | June 29, 1943 |
| 2,338,692 | Winter | Jan. 4, 1944 |